(12) United States Patent
Park et al.

(10) Patent No.: US 11,706,633 B2
(45) Date of Patent: *Jul. 18, 2023

(54) METHOD AND APPARATUS FOR PERFORMING WIRELESS COMMUNICATION IN UNLICENSED BAND

(71) Applicant: KT CORPORATION, Gyeonggi-do (KR)

(72) Inventors: Ki-Hyeon Park, Seoul (KR); Ki-tae Kim, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/504,786

(22) Filed: Oct. 19, 2021

(65) Prior Publication Data

US 2022/0038916 A1 Feb. 3, 2022

Related U.S. Application Data

(63) Continuation of application No. 16/512,250, filed on Jul. 15, 2019, now Pat. No. 11,184,776.

(30) Foreign Application Priority Data

Jul. 16, 2018 (KR) .................. 10-2018-0082560
Sep. 14, 2018 (KR) .................. 10-2018-0110332
Jun. 18, 2019 (KR) .................. 10-2019-0071954

(51) Int. Cl.
*H04W 16/14* (2009.01)
*H04W 74/08* (2009.01)
(Continued)

(52) U.S. Cl.
CPC ........... *H04W 16/14* (2013.01); *H04L 1/1614* (2013.01); *H04W 72/23* (2023.01); *H04W 74/0808* (2013.01); *H04W 76/11* (2018.02)

(58) Field of Classification Search
CPC . H04W 16/14; H04W 74/0808; H04W 76/11; H04W 72/042; H04W 74/0825;
(Continued)

(56) References Cited

U.S. PATENT DOCUMENTS

2017/0013479 A1   1/2017   Sun et al.
2017/0086172 A1*  3/2017   Dinan ................. H04W 72/042
(Continued)

FOREIGN PATENT DOCUMENTS

KR   10-2018-0018391 A   2/2018
KR   10-2018-0027504 A   3/2018
KR   10-2018-0080225 A   7/2018

OTHER PUBLICATIONS

Huawei et al., "BWP operation in NR unlicensed band", R1-1805923, 3GPP TSG RAN WG1 Meeting #93, Busan, Korea, May 21-May 25, 2018.
(Continued)

*Primary Examiner* — Sharmin Chowdhury
(74) *Attorney, Agent, or Firm* — Invenstone Patent, LLC

(57) ABSTRACT

Provided are a method and a device performing wireless communication in an unlicensed band, which receives information on allocating a radio resource in a system bandwidth made up of a plurality of subbands, receives information on a LBT (Listen Before Talk) failure region among the radio resource, and receives a downlink signal in other regions in the radio resource, except the LBT failure region.

13 Claims, 18 Drawing Sheets

(51) Int. Cl.
*H04L 1/1607* (2023.01)
*H04W 76/11* (2018.01)
*H04W 72/23* (2023.01)

(58) Field of Classification Search
CPC ...... H04W 72/044; H04L 1/1614; H04L 1/08; H04L 1/1854; H04L 5/0094; H04L 5/0007
See application file for complete search history.

(56) References Cited

U.S. PATENT DOCUMENTS

| | | |
|---|---|---|
| 2017/0135128 A1 | 5/2017 | Yerramalli et al. |
| 2019/0059085 A1 | 2/2019 | Sun et al. |
| 2019/0103954 A1* | 4/2019 | Lee .................. H04L 5/0098 |
| 2019/0141734 A1 | 5/2019 | Lei et al. |
| 2019/0239198 A1* | 8/2019 | Zhang .................. H04W 72/04 |
| 2020/0187236 A1 | 6/2020 | Moon et al. |
| 2020/0344798 A1 | 10/2020 | Yerramalli et al. |
| 2021/0092622 A1 | 3/2021 | Tiirola et al. |

OTHER PUBLICATIONS

Huawei et al., "UCI transmission in NR operations in unlicensed", R1-1803682, 3GPP TSG RAN WG1 Meeting #92bis, Sanya, China, Apr. 16-Apr. 20, 2018.
Nterdigital Inc., "BWP operation in unlicensed spectrum", R1-1804680, 3GPP RAN WG1 Meeting #92bis, Sanya, China, Apr. 16-20, 2018, pp. 1-4.

* cited by examiner

*FIG.15*

DCI format

| ... | subband LBT information | ... | scheduling information | ... |

METHOD AND APPARATUS FOR PERFORMING WIRELESS COMMUNICATION IN UNLICENSED BAND

CROSS-REFERENCE TO RELATED APPLICATIONS

This application is a continuation application of U.S. patent application Ser. No. 16/512,250, filed on Jul. 15, 2019, which claims priority under 35 U.S.C § 119(a) of Patent Application No. 10-2018-0082560, filed on Jul. 16, 2018, Patent Application No. 10-2018-0110332, filed on Sep. 14, 2018, and Patent Application No. 10-2019-0071954, filed on Jun. 18, 2019, in Korea, the entire contents of which are incorporated herein by reference.

BACKGROUND OF THE INVENTION

Field of the Invention

The present disclosure relates to a method and a device of performing wireless communication in a next generation mobile communication network, and more specifically, to a method and a device of performing wireless communication considering failure of LBT(Listen Before Talk) for an unlicensed band.

Description of the Prior Art

Recently, the $3^{rd}$ generation partnership project (3GPP) has approved the "Study on New Radio Access Technology", which is a study item for research on next-generation/5G radio access technology (hereinafter, referred to as "new radio" or "NR"). On the basis of the Study on New Radio Access Technology, Radio Access Network Working Group 1 (RAN WG1) has been discussing frame structures, channel coding and modulation, waveforms, multiple access methods, and the like for the new radio (NR). It is required to design the NR not only to provide an improved data transmission rate as compared with the long term evolution (LTE)/LTE-Advanced, but also to meet various requirements in detailed and specific usage scenarios.

An enhanced mobile broadband (eMBB), massive machine-type communication (mMTC), and ultra reliable and low latency communication (URLLC) are proposed as representative usage scenarios of the NR. In order to meet the requirements of the individual scenarios, it is required to design the NR to have flexible frame structures, compared with the LTE/LTE-Advanced.

Because the requirements for data rates, latency, reliability, coverage, etc. are different from each other, there is a need for a method for efficiently multiplexing a radio resource unit based on different numerologies from other (E.g., subcarrier spacing, subframe, Transmission Time Interval (TTI), etc.) as a method for efficiently satisfying each usage scenario requirement through a frequency band constituting any NR system.

One aspect, it is necessary to develop a method of performing wireless communication according to a result of performing LBT on a plurality of subbands constituting an unlicensed band in the NR.

SUMMARY OF THE INVENTION

In accordance with embodiments of the present disclosure, methods and devices are provided for efficiently performing wireless communication when resource allocation is performed over a plurality of subbands in an unlicensed band and when a part of the subbands of an allocated resource is in an unavailable state or not available.

In addition, in accordance with embodiments of the present disclosure, methods and devices are provided for transmitting information about an LBT failure region, which is a subband in an unavailable state when the resource allocation is performed over the plurality of the subbands in the unlicensed band.

In accordance with one aspect of the present disclosure, a method of a user equipment is provided for performing the wireless communication in an unlicensed band. The method includes: receiving information on allocating a radio resource in a system bandwidth composed of a plurality of subbands, receiving information on a LBT (Listen Before Talk) failure region among the radio resource and receiving a downlink signal in other regions, except the LBT failure region, in the radio resource.

In accordance with another aspect of the present disclosure, a method of a base station is provided for performing the wireless communication in an unlicensed band. The method includes: performing a LBT (Listen Before Talk) for each of subbands in a system bandwidth composed of a plurality of the subbands, transmitting information on allocating a radio resource in the system bandwidth, transmitting information on a LBT (Listen Before Talk) failure region among the radio resource, and transmitting a downlink signal in other region s, except the LBT failure region, in the radio resource.

In accordance with further another aspect of the present disclosure, a user equipment is provided for performing the wireless communication in an unlicensed band. The user equipment includes: a receiver receiving information on allocating a radio resource in a system bandwidth composed of a plurality of subbands and information on a LBT (Listen Before Talk) failure region among the radio resource, and receiving a downlink signal in other region s, except the LBT failure region, in the radio resource, and a controller controlling an operation of the receiver.

In accordance with yet another aspect of the present disclosure, a base station is provided for performing the wireless communication in an unlicensed band. The base station includes: a controller performing a LBT (Listen Before Talk) for each of subbands in a system bandwidth composed of a plurality of the subbands, and a transmitter transmitting information on allocating a radio resource in the system bandwidth and information on a LBT (Listen Before Talk) failure region among the radio resource; and transmitting a downlink signal in other region s, except the LBT failure region, in the radio resource.

Methods and devices according to embodiments of the present disclosure may efficiently perform the wireless communication in an unlicensed band when resource allocation is performed over the plurality of the subbands in the unlicensed band and a part of the subbands of an allocated resource is in an unavailable state or not available.

Methods and devices according to embodiments of the present disclosure may transmit information about an LBT failure region, which is a subband in an unavailable state when the resource allocation is performed over the plurality of the subbands in the unlicensed band.

BRIEF DESCRIPTION OF THE DRAWINGS

The above and other aspects, features, and advantages of the present disclosure will be more apparent from the following detailed description taken in conjunction with the accompanying drawings, in which:

FIGS. 15 and 16 are diagrams for explaining a DCI format including information on an LBT failure region according to the embodiment;

DETAILED DESCRIPTION OF THE EXEMPLARY EMBODIMENTS

Figure 1:
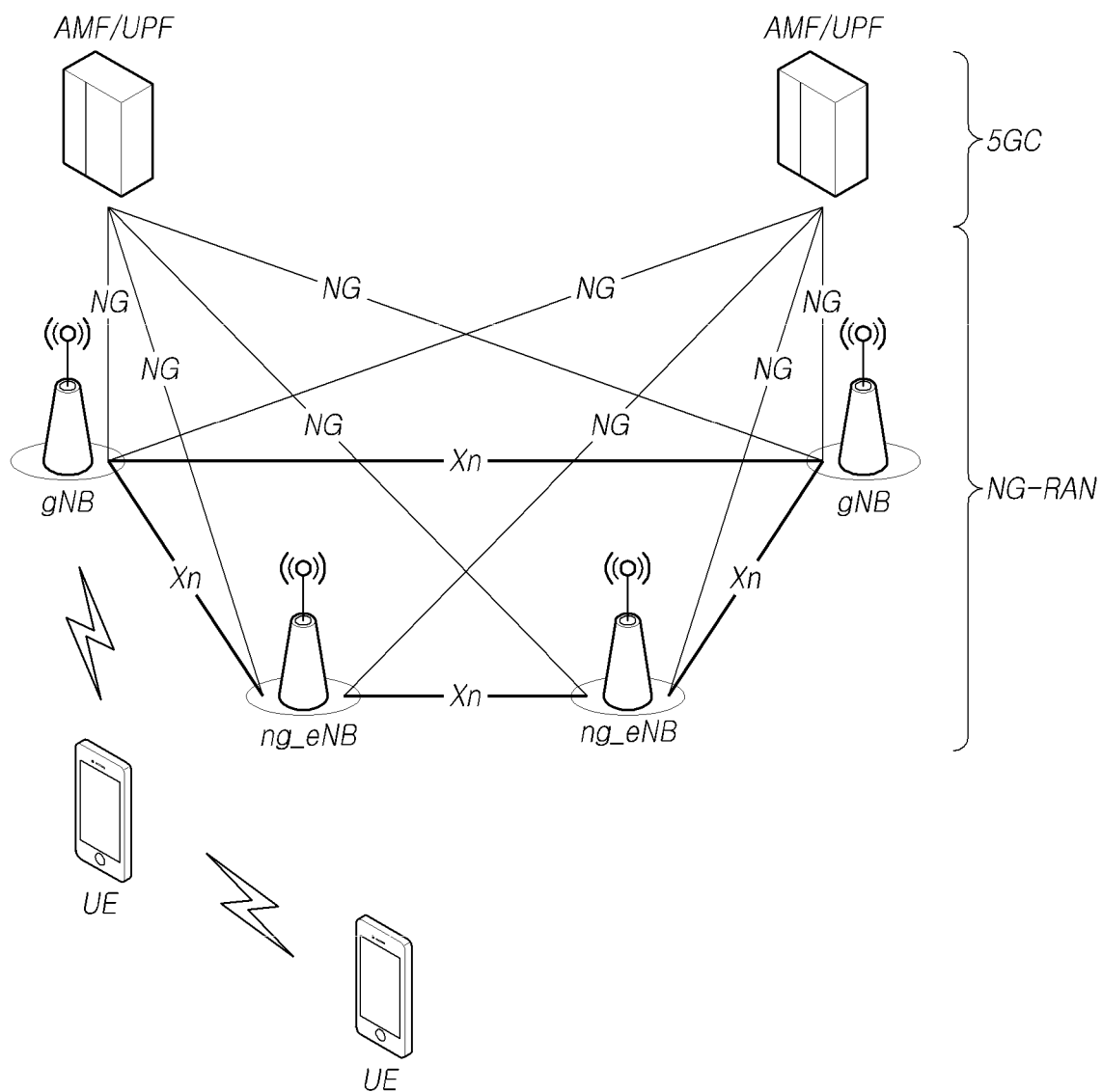
FIG. 1 is a view schematically illustrating an NR wireless communication system to which at least one embodiment is applicable.

Hereinafter, some embodiments of the present disclosure will be described in detail with reference to the accompanying illustrative drawings. In the drawings, like reference numerals are used to denote like elements throughout the drawings, even if they are shown on different drawings. Further, in the following description of the present disclosure, a detailed description of known functions and configurations incorporated herein will be omitted when it may make the subject matter of the present disclosure rather unclear. When the expression "include", "have", "comprise", or the like as mentioned herein is used, any other part may be added unless the expression "only" is used. When an element is expressed in the singular, the element may cover the plural form unless a special mention is explicitly made of the element.

In addition, terms, such as first, second, A, B, (a), (b) or the like may be used herein when describing components of the present disclosure. Each of these terminologies is not used to define an essence, order or sequence of a corresponding component but used merely to distinguish the corresponding component from other component(s).

In describing the positional relationship between components, if two or more components are described as being "connected", "combined", or "coupled" to each other, it should be understood that two or more components may be directly "connected", "combined", or "coupled" to each other, and that two or more components may be "connected", "combined", or "coupled" to each other with another component "interposed" therebetween. In this case, another component may be included in at least one of the two or more components that are "connected", "combined", or "coupled" to each other.

In the description of a sequence of operating methods or manufacturing methods, for example, the expressions using "after", "subsequent to", "next", "before", and the like may also encompass the case in which operations or processes are performed discontinuously unless "immediately" or "directly" is used in the expression.

Numerical values for components or information corresponding thereto (e.g., levels or the like), which are mentioned herein, may be interpreted as including an error range caused by various factors (e.g., process factors, internal or external impacts, noise, etc.) even if an explicit description thereof is not provided.

The wireless communication system in the present specification refers to a system for providing various communication services, such as a voice service and a data service, using radio resources. The wireless communication system may include a user equipment (UE), a base station, a core network, and the like.

Embodiments disclosed below may be applied to a wireless communication system using various radio access technologies. For example, the embodiments may be applied to various radio access technologies such as code division multiple access (CDMA), frequency division multiple access (FDMA), time division multiple access (TDMA), orthogonal frequency division multiple access (OFDMA), single-carrier frequency division multiple access (SC-FDMA), non-orthogonal multiple access (NOMA), or the like. In addition, the radio access technology may refer to respective generation communication technologies established by various communication organizations, such as 3GPP, 3GPP2, WiFi, Bluetooth, IEEE, ITU, or the like, as well as a specific access technology. For example, CDMA may be implemented as a wireless technology such as universal terrestrial radio access (UTRA) or CDMA2000. TDMA may be implemented as a wireless technology such as global system for mobile communications (GSM)/general packet radio service (GPRS)/enhanced data rates for GSM evolution (EDGE). OFDMA may be implemented as a wireless technology such as IEEE (Institute of Electrical and Electronics Engineers) 802.11 (Wi-Fi), IEEE 802.16 (WiMAX), IEEE 802-20, evolved UTRA (E-UTRA), and the like. IEEE 802.16m is evolution of IEEE 802.16e, which provides backward compatibility with systems based on IEEE 802.16e. UTRA is a part of a universal mobile telecommunications system (UMTS). 3GPP (3rd-generation partnership project) LTE (long-term evolution) is a part of E-UMTS (evolved UMTS) using evolved-UMTS terrestrial radio access (E-UTRA), which adopts OFDMA in a downlink and SC-FDMA in an uplink. As described above, the embodiments may be applied to radio access technologies that have been launched or commercialized, and may be applied to radio access technologies that are being developed or will be developed in the future.

The UE used in the specification must be interpreted as a broad meaning that indicates a device including a wireless communication module that communicates with a base station in a wireless communication system. For example, the UE includes user equipment (UE) in WCDMA, LTE, NR, HSPA, IMT-2020 (5G or New Radio), and the like, a mobile station in GSM, a user terminal (UT), a subscriber station (SS), a wireless device, and the like. In addition, the UE may be a portable user device, such as a smart phone, or may be a vehicle, a device including a wireless communication module in the vehicle, and the like in a V2X communication system according to the usage type thereof. In the case of a machine-type communication (MTC) system, the UE may refer to an MTC terminal, an M2M terminal, or a URLLC terminal, which employs a communication module capable of performing machine-type communication.

A base station or a cell in the present specification refers to an end that communicates with a UE through a network and encompasses various coverage regions such as a Node-B, an evolved Node-B (eNB), a gNode-B, a low-power node (LPN), a sector, a site, various types of antennas, a base transceiver system (BTS), an access point, a point (e.g., a transmission point, a reception point, or a transmission/reception point), a relay node, a megacell, a macrocell, a microcell, a picocell, a femtocell, a remote radio head (RRH), a radio unit (RU), a small cell, and the like. In addition, the cell may be used as a meaning including a bandwidth part (BWP) in the frequency domain. For example, the serving cell may refer to an active BWP of a UE.

The various cells listed above are provided with a base station controlling one or more cells, and the base station may be interpreted as two meanings. The base station may be 1) a device for providing a megacell, a macrocell, a microcell, a picocell, a femtocell, or a small cell in connection with a wireless region, or the base station may be 2) a wireless region itself. In the above description 1), the base station may be the devices controlled by the same entity and providing predetermined wireless regions or all devices interacting with each other and cooperatively configuring a wireless region. For example, the base station may be a point, a transmission/reception point, a transmission point, a reception point, and the like according to the configuration method of the wireless region. In the above description 2), the base station may be the wireless region in which a user equipment (UE) may be enabled to transmit data to and receive data from the other UE or a neighboring base station.

In this specification, the cell may refer to coverage of a signal transmitted from a transmission/reception point, a component carrier having coverage of a signal transmitted from a transmission/reception point (or a transmission point), or a transmission/reception point itself.

An uplink (UL) refers to a scheme of transmitting data from a UE to a base station, and a downlink (DL) refers to a scheme of transmitting data from a base station to a UE. The downlink may mean communication or communication paths from multiple transmission/reception points to a UE, and the uplink may mean communication or communication paths from a UE to multiple transmission/reception points. In the downlink, a transmitter may be a part of the multiple transmission/reception points, and a receiver may be a part of the UE. In addition, in the uplink, the transmitter may be a part of the UE, and the receiver may be a part of the multiple transmission/reception points.

The uplink and downlink transmit and receive control information through a control channel, such as a physical downlink control channel (PDCCH) and a physical uplink control channel (PUCCH). The uplink and downlink transmit and receive data through a data channel such as a physical downlink shared channel (PDSCH) and a physical uplink shared channel (PUSCH). Hereinafter, the transmission and reception of a signal through a channel, such as PUCCH, PUSCH, PDCCH, PDSCH, or the like, may be expressed as "PUCCH, PUSCH, PDCCH, PDSCH, or the like is transmitted and received".

For the sake of clarity, the following description will focus on 3GPP LTE/LTE-A/NR (New Radio) communication systems, but technical features of the disclosure are not limited to the corresponding communication systems.

3GPP has been developing a 5G (5th-Generation) communication technology in order to meet the requirements of a next-generation radio access technology of ITU-R after studying 4G (4th-generation) communication technology. Specifically, 3GPP is developing, as a 5G communication technology, LTE-A pro by improving the LTE-Advanced technology so as to conform to the requirements of ITU-R and a new NR communication technology that is totally different from 4G communication technology. LTE-A pro and NR all refer to the 5G communication technology. Hereinafter, the 5G communication technology will be described on the basis of NR unless a specific communication technology is specified.

Various operating scenarios have been defined in NR in consideration of satellites, automobiles, new verticals, and the like in the typical 4G LTE scenarios so as to support an enhanced mobile broadband (eMBB) scenario in terms of services, a massive machine-type communication (mMTC) scenario in which UEs spread over a broad region at a high UE density, thereby requiring low data rates and asynchronous connections, and an ultra-reliability and low-latency (URLLC) scenario that requires high responsiveness and reliability and supports high-speed mobility.

In order to satisfy such scenarios, NR discloses a wireless communication system employing a new waveform and frame structure technology, a low-latency technology, a super-high frequency band (mmWave) support technology, and a forward compatible provision technology. In particular, the NR system has various technological changes in terms of flexibility in order to provide forward compatibility. The primary technical features of NR will be described below with reference to the drawings.

<Overview of NR System>

FIG. 1 is a view schematically illustrating an NR system to which the present embodiment is applicable.

Referring to FIG. 1, the NR system is divided into a 5G core network (5GC) and an NG-RAN part, and the NG-RAN includes gNBs and ng-eNBs providing user plane (SDAP/PDCP/RLC/MAC/PHY) and user equipment (UE) control plane (RRC) protocol ends. The gNBs or the gNB and the ng-eNB are connected to each other through Xn interfaces. The gNB and the ng-eNB are connected to the 5GC through NG interfaces, respectively. The 5GC may be configured to include an access and mobility management function (AMF) for managing a control plane, such as a UE connection and mobility control function, and a user plane function (UPF) controlling user data. NR supports both frequency bands below 6 GHz (frequency range 1: FR1) and frequency bands equal to or greater than 6 GHz (frequency range 2: FR2).

The gNB denotes a base station that provides a UE with an NR user plane and control plane protocol end, and the ng-eNB denotes a base station that provides a UE with an E-UTRA user plane and control plane protocol end. The base station described in the present specification should be understood as encompassing the gNB and the ng-eNB. However, the base station may be also used to refer to the gNB or the ng-eNB separately from each other, as necessary.

<NR Waveform, Numerology, and Frame Structure>

NR uses a CP-OFDM waveform using a cyclic prefix for downlink transmission and uses CP-OFDM or DFT-s-OFDM for uplink transmission. OFDM technology is easy to combine with a multiple-input multiple-output (MIMO) scheme and allows a low-complexity receiver to be used with high frequency efficiency.

Since the three scenarios described above have different requirements for data rates, delay rates, coverage, and the like from each other in NR, it is necessary to efficiently satisfy the requirements for each scenario through frequency bands constituting the NR system. To this end, a technique for efficiently multiplexing radio resources based on a plurality of different numerologies has been proposed.

Specifically, the NR transmission numerology is determined on the basis of subcarrier spacing and a cyclic prefix (CP), and, as shown in Table 1 below, "$\mu$" is used as an exponential value of 2 so as to be changed exponentially on the basis of 15 kHz.

TABLE 1

| $\mu$ | Subcarrier spacing | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Figure 2:
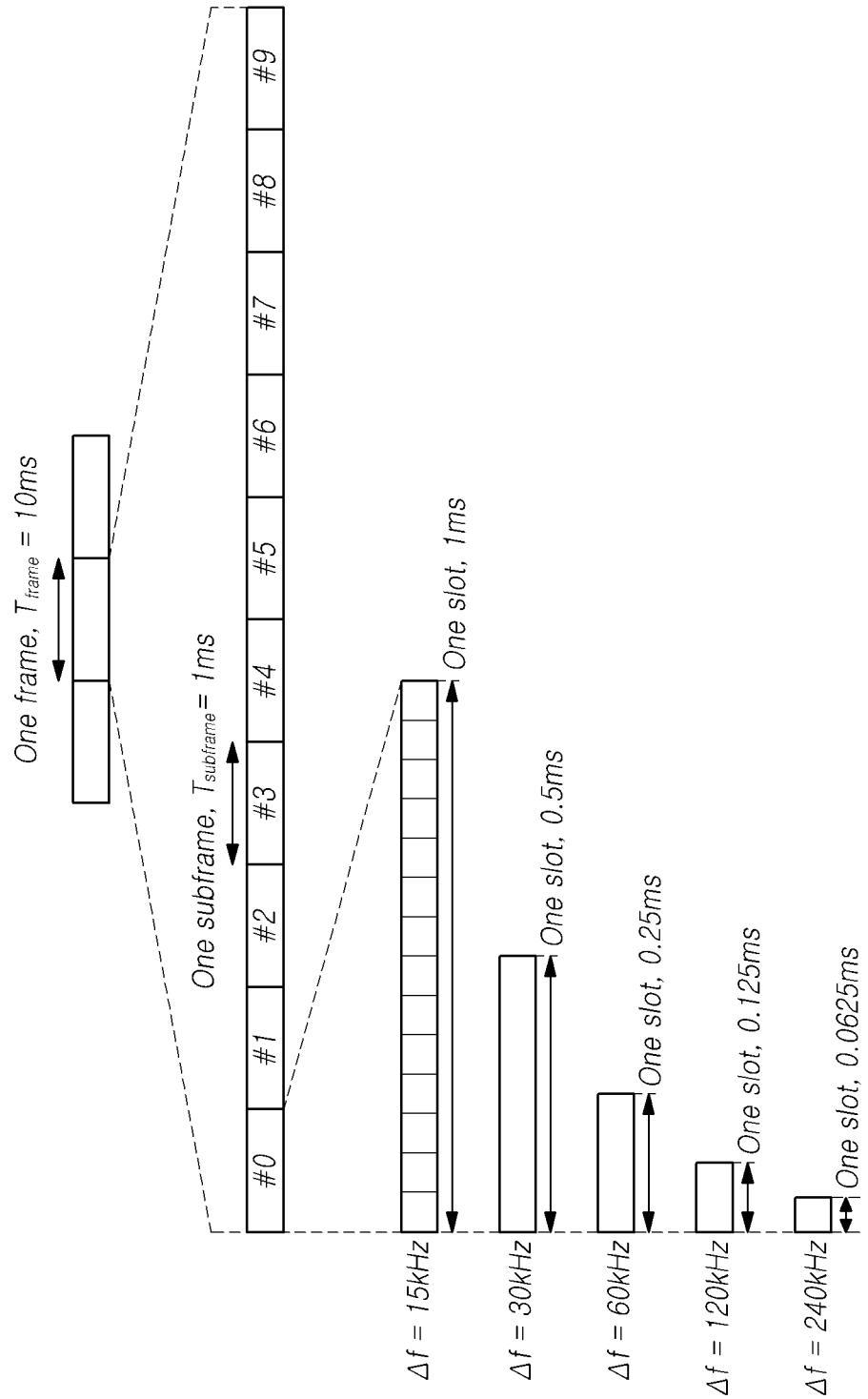
FIG. 2 is a view for explaining a frame structure in an NR system to which at least one embodiment is applicable.

As shown in Table 1 above, NR may have five types of numerologies according to subcarrier spacing. This is different from LTE, which is one of the 4G-communication technologies, in which the subcarrier spacing is fixed to 15 kHz. Specifically, in NR, subcarrier spacing used for data transmission is 15, 30, 60, or 120 kHz, and subcarrier spacing used for synchronization signal transmission is 15, 30, 12, or 240 kHz. In addition, an extended CP is applied only to the subcarrier spacing of 60 kHz. A frame that includes 10 subframes each having the same length of 1 ms and has a length of 10 ms is defined in the frame structure in NR. One frame may be divided into half frames of 5 ms, and each half frame includes 5 subframes. In the case of a subcarrier spacing of 15 kHz, one subframe includes one slot, and each slot includes 14 OFDM symbols. FIG. 2 is a view for explaining a frame structure in an NR system to which the present embodiment may be applied.

Referring to FIG. 2, a slot includes 14 OFDM symbols, which are fixed, in the case of a normal CP, but the length of the slot in the time domain may be varied depending on subcarrier spacing. For example, in the case of a numerology having a subcarrier spacing of 15 kHz, the slot is configured to have the same length of 1 ms as that of the subframe. On the other hand, in the case of a numerology having a subcarrier spacing of 30 kHz, the slot includes 14 OFDM symbols, but one subframe may include two slots each having a length of 0.5 ms. That is, the subframe and the frame may be defined using a fixed time length, and the slot may be defined as the number of symbols such that the time length thereof is varied depending on the subcarrier spacing.

NR defines a basic unit of scheduling as a slot and also introduces a minislot (or a subslot or a non-slot-based schedule) in order to reduce a transmission delay of a radio section. If wide subcarrier spacing is used, the length of one slot is shortened in inverse proportion thereto, thereby reducing a transmission delay in the radio section. A minislot (or subslot) is intended to efficiently support URLLC scenarios, and the minislot may be scheduled in 2, 4, or 7 symbol units.

In addition, unlike LTE, NR defines uplink and downlink resource allocation as a symbol level in one slot. In order to reduce a HARQ delay, the slot structure capable of directly transmitting HARQ ACK/NACK in a transmission slot has been defined. Such a slot structure is referred to as a "self-contained structure", which will be described.

NR was designed to support a total of 256 slot formats, and 62 slot formats thereof are used in 3GPP Rel-15. In addition, NR supports a common frame structure constituting an FDD or TDD frame through combinations of various slots. For example, NR supports i) a slot structure in which all symbols of a slot are configured for a downlink, ii) a slot structure in which all symbols are configured for an uplink, and iii) a slot structure in which downlink symbols and uplink symbols are mixed. In addition, NR supports data transmission that is scheduled to be distributed to one or more slots. Accordingly, the base station may inform the UE of whether the slot is a downlink slot, an uplink slot, or a flexible slot using a slot format indicator (SFI). The base station may inform a slot format by instructing, using the SFI, the index of a table configured through UE-specific RRC signaling. Further, the base station may dynamically instruct the slot format through downlink control information (DCI) or may statically or quasi-statically instruct the same through RRC signaling.

<Physical Resources of NR>

With regard to physical resources in NR, antenna ports, resource grids, resource elements, resource blocks, bandwidth parts, and the like are taken into consideration.

The antenna port is defined to infer a channel carrying a symbol on an antenna port from the other channel carrying another symbol on the same antenna port. If large-scale properties of a channel carrying a symbol on an antenna port can be inferred from the other channel carrying a symbol on another antenna port, the two antenna ports may have a quasi-co-located or quasi-co-location (QC/QCL) relationship. The large-scale properties include at least one of delay spread, Doppler spread, a frequency shift, an average received power, and a received timing.

Figure 3:
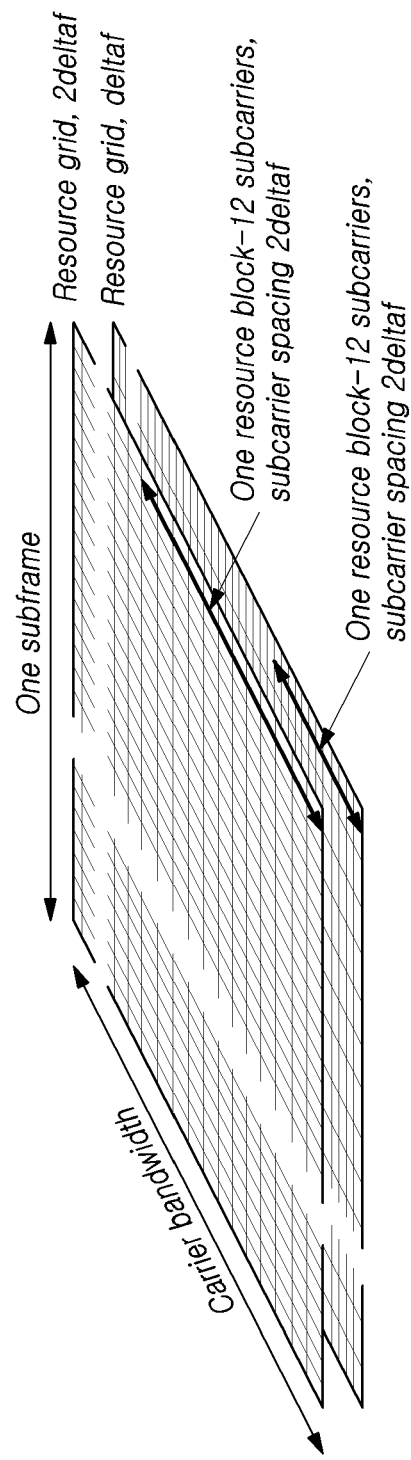
FIG. 3 is a view for explaining resource grids supported by a radio access technology to which at least one embodiment is applicable.

FIG. 3 is a view for explaining resource grids supported by a radio access technology to which the present embodiment is applicable.

Referring to FIG. 3, resource grids may exist according to respective numerologies because NR supports a plurality of numerologies in the same carrier. In addition, the resource grids may exist depending on antenna ports, subcarrier spacing, and transmission directions.

A resource block includes 12 subcarriers and is defined only in the frequency domain. In addition, a resource element includes one OFDM symbol and one subcarrier. Therefore, as shown in FIG. 3, the size of one resource block may be varied according to the subcarrier spacing. Further, "Point A" that acts as a common reference point for the resource block grids, a common resource block, and a virtual resource block are defined in NR.

Figure 4:
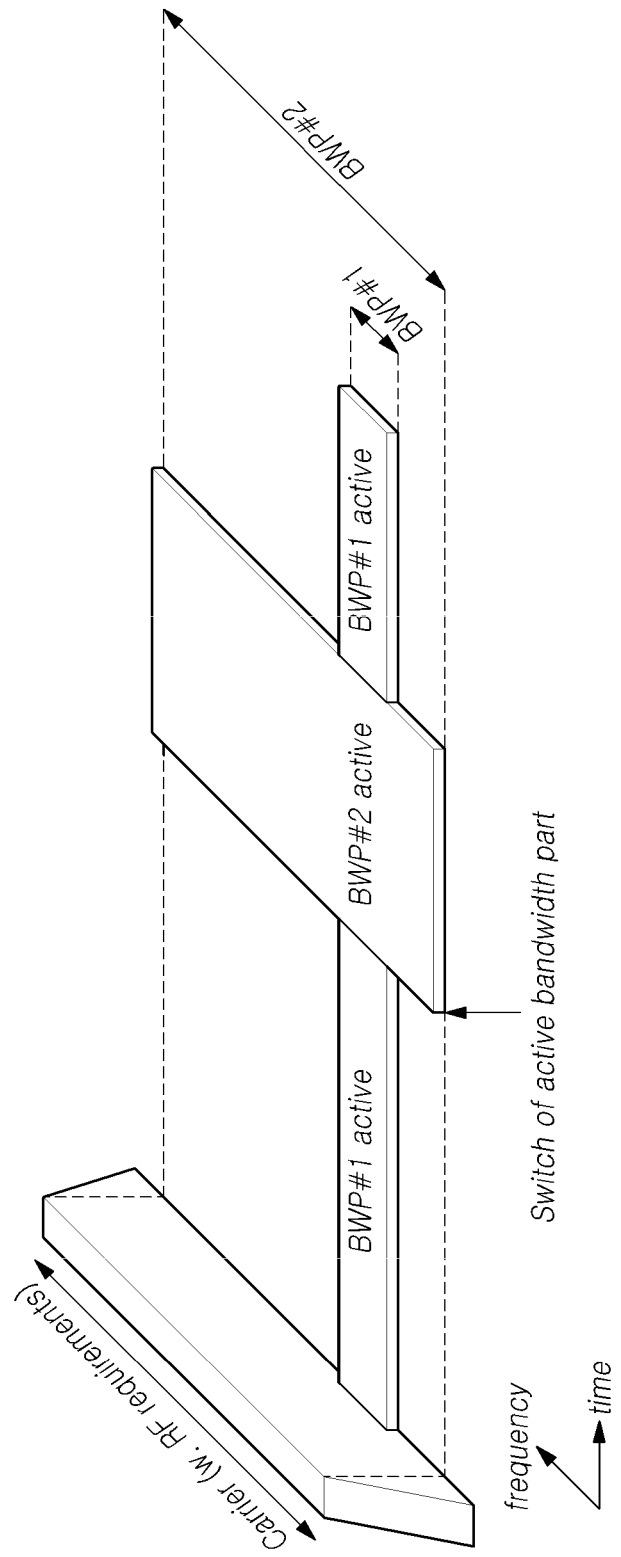
FIG. 4 is a view for explaining bandwidth parts supported by a radio access technology to which at least one embodiment is applicable.

FIG. 4 is a view for explaining bandwidth parts supported by a radio access technology to which the present embodiment is applicable.

Unlike LTE in which the carrier bandwidth is fixed to 20 MHz, the maximum carrier bandwidth is configured as 50 MHz to 400 MHz depending on the subcarrier spacing in NR. Therefore, it is not assumed that all UEs use the entire carrier bandwidth. Accordingly, as shown in FIG. 4, bandwidth parts (BWPs) may be specified within the carrier bandwidth in NR so that the UE may use the same. In addition, the bandwidth part may be associated with one numerology, may include a subset of consecutive common resource blocks, and may be activated dynamically over time. The UE has up to four bandwidth parts in each of the uplink and the downlink, and the UE transmits and receives data using an activated bandwidth part during a given time.

In the case of a paired spectrum, uplink and downlink bandwidth parts are configured independently. In the case of an unpaired spectrum, in order to prevent unnecessary frequency re-tuning between a downlink operation and an uplink operation, the downlink bandwidth part and the uplink bandwidth part are configured in pairs so as to share a center frequency.

<Initial Access in NR>

In NR, a UE performs a cell search and a random access procedure in order to access and communicates with a base station.

The cell search is a procedure of the UE for synchronizing with a cell of a corresponding base station using a synchronization signal block (SSB) transmitted from the base station and acquiring a physical-layer cell ID and system information.

Figure 5:
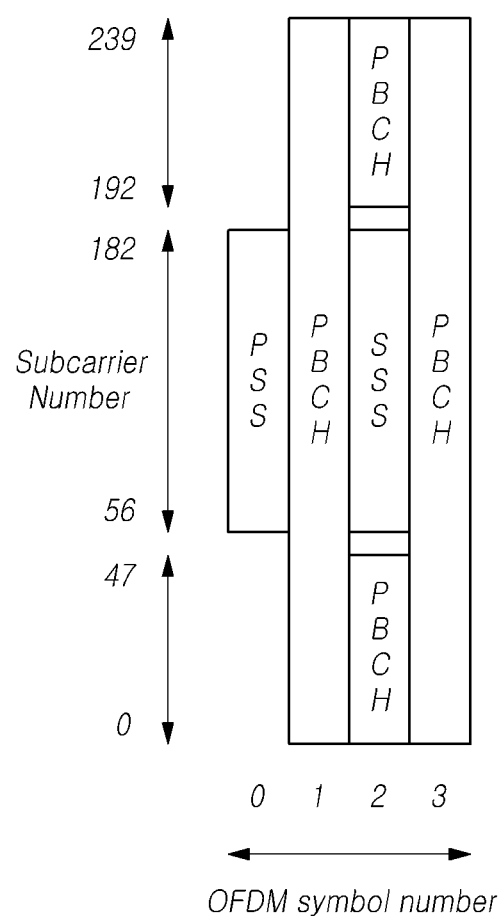
FIG. 5 is a view illustrating an example of a synchronization signal block in a radio access technology to which at least one embodiment is applicable.

FIG. 5 is a view illustrating an example of a synchronization signal block in a radio access technology to which the present embodiment is applicable.

Referring to FIG. 5, the SSB includes a primary synchronization signal (PSS) and a secondary synchronization signal (SSS), which occupy one symbol and 127 subcarriers, and PBCHs spanning three OFDM symbols and 240 subcarriers.

The UE monitors the SSB in the time and frequency domain, thereby receiving the SSB.

The SSB may be transmitted up to 64 times for 5 ms. A plurality of SSBs are transmitted by different transmission beams within a time of 5 ms, and the UE performs detection on the assumption that the SSB is transmitted every 20 ms based on a specific beam used for transmission. The number of beams that can be used for SSB transmission within 5 ms may be increased as the frequency band is increased. For example, up to 4 SSB beams may be transmitted at a frequency band of 3 GHz or less, and up to 8 SSB beams may be transmitted at a frequency band of 3 to 6 GHz. In addition, the SSBs may be transmitted using up to 64 different beams at a frequency band of 6 GHz or more.

One slot includes two SSBs, and a start symbol and the number of repetitions in the slot are determined according to subcarrier spacing as follows.

Unlike the SS in the typical LTE system, the SSB is not transmitted at the center frequency of a carrier bandwidth. That is, the SSB may also be transmitted at the frequency other than the center of the system band, and a plurality of SSBs may be transmitted in the frequency domain in the case of supporting a broadband operation. Accordingly, the UE monitors the SSB using a synchronization raster, which is a candidate frequency position for monitoring the SSB. A carrier raster and a synchronization raster, which are the center frequency position information of the channel for the initial connection, were newly defined in NR, and the synchronization raster may support a fast SSB search of the UE because the frequency spacing thereof is configured to be wider than that of the carrier raster.

The UE may acquire an MIB through the PBCH of the SSB. The MIB (master information block) includes minimum information for the UE to receive remaining minimum system information (RMSI) broadcast by the network. In addition, the PBCH may include information on the position of the first DM-RS symbol in the time domain, information for the UE to monitor SIB1 (e.g., SIB1 numerology information, information related to SIB1 CORESET, search space information, PDCCH-related parameter information, etc.), offset information between the common resource block and the SSB (the position of an absolute SSB in the carrier is transmitted via SIB1), and the like. The SIB1 numerology information is also applied to some messages used in the random access procedure for the UE to access the base station after completing the cell search procedure. For example, the numerology information of SIB1 may be applied to at least one of the messages 1 to 4 for the random access procedure.

The above-mentioned RMSI may mean SIB1 (system information block 1), and SIB1 is broadcast periodically (e.g., 160 ms) in the cell. SIB1 includes information necessary for the UE to perform the initial random access procedure, and SIB1 is periodically transmitted through a PDSCH. In order to receive SIB1, the UE must receive numerology information used for the SIB1 transmission and the CORESET (control resource set) information used for scheduling of SIB1 through a PBCH. The UE identifies scheduling information for SIB1 using SI-RNTI in the CORESET, and acquires SIB1 on the PDSCH according to scheduling information. The remaining SIBs other than SIB1 may be periodically transmitted, or the remaining SIBs may be transmitted according to the request of the UE.

Figure 6:
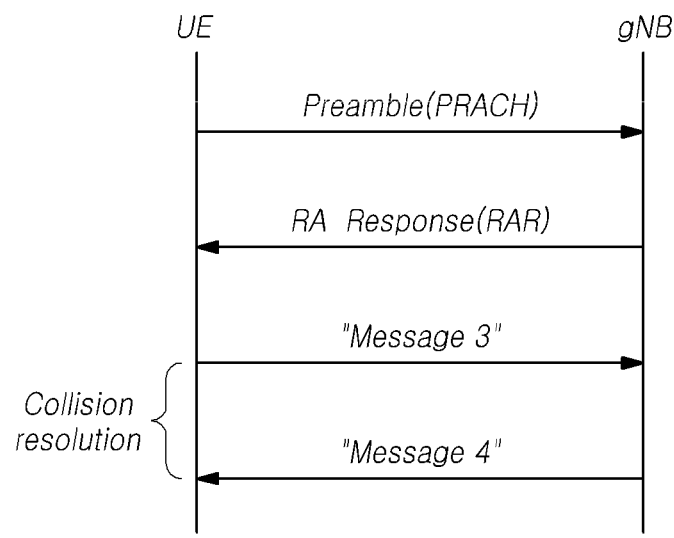
FIG. 6 is a view for explaining a random access procedure in a radio access technology to which at least one embodiment is applicable.

FIG. 6 is a view for explaining a random access procedure in a radio access technology to which the present embodiment is applicable.

Referring to FIG. 6, if a cell search is completed, the UE transmits a random access preamble for random access to the base station. The random access preamble is transmitted through a PRACH. Specifically, the random access preamble is periodically transmitted to the base station through the PRACH that includes consecutive radio resources in a specific slot repeated. In general, a contention-based random access procedure is performed when the UE makes initial access to a cell, and a non-contention-based random access procedure is performed when the UE performs random access for beam failure recovery (BFR).

The UE receives a random access response to the transmitted random access preamble. The random access response may include a random access preamble identifier (ID), UL Grant (uplink radio resource), a temporary C-RNTI (temporary cell-radio network temporary identifier), and a TAC (time alignment command). Since one random access response may include random access response information for one or more UEs, the random access preamble identifier may be included in order to indicate the UE for which the included UL Grant, temporary C-RNTI, and TAC are valid. The random access preamble identifier may be an identifier of the random access preamble received by the base station. The TAC may be included as information for the UE to adjust uplink synchronization. The random access response may be indicated by a random access identifier on the PDCCH, i.e., a random access-radio network temporary identifier (RA-RNTI).

Upon receiving a valid random access response, the UE processes information included in the random access response and performs scheduled transmission to the base station. For example, the UE applies the TAC and stores the temporary C-RNTI. In addition, the UE transmits, to the base station, data stored in the buffer of the UE or newly generated data using the UL Grant. In this case, information for identifying the UE must be included in the data.

Lastly, the UE receives a downlink message to resolve the contention.

<NR CORESET>

The downlink control channel in NR is transmitted in a CORESET (control resource set) having a length of 1 to 3 symbols, and the downlink control channel transmits uplink/downlink scheduling information, an SFI (slot format index), TPC (transmit power control) information, and the like.

As described above, NR has introduced the concept of CORESET in order to secure the flexibility of a system. The CORESET (control resource set) refers to a time-frequency resource for a downlink control signal. The UE may decode a control channel candidate using one or more search spaces in the CORESET time-frequency resource. CORESET-specific QCL (quasi-colocation) assumption is configured and is used for the purpose of providing information on the characteristics of analogue beam directions, as well as delay spread, Doppler spread, Doppler shift, and an average delay, which are the characteristics assumed by existing QCL.

Figure 7:
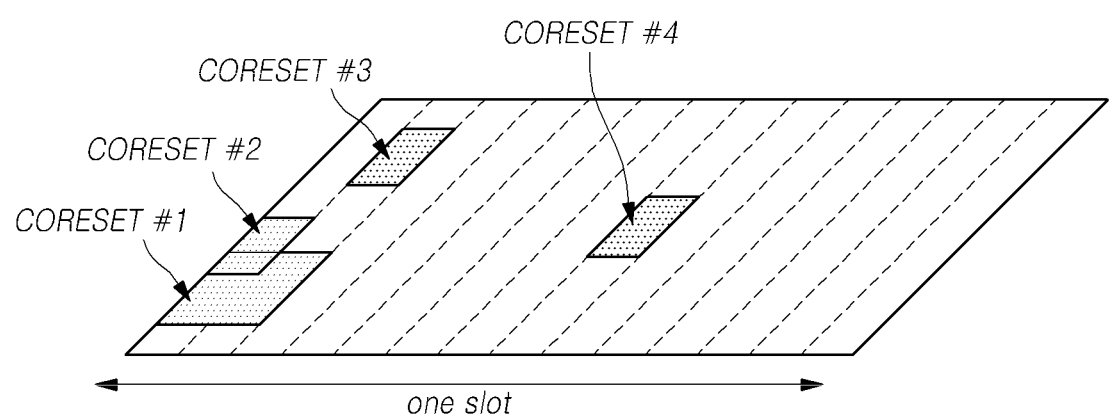
FIG. 7 is a view for explaining CORESET.

FIG. 7 is a view for explaining CORESETs.

Referring to FIG. 7, CORESETs may exist in various forms within a carrier bandwidth in a single slot, and the CORESET may include a maximum of 3 OFDM symbols in the time domain. In addition, the CORESET is defined as a multiple of six resource blocks up to the carrier bandwidth in the frequency domain.

A first CORESET, as a portion of the initial bandwidth part, is designated (e.g., instructed, assigned) through an MIB in order to receive additional configuration information and system information from a network. After establishing a connection with the base station, the UE may receive and configure one or more pieces of CORESET information through RRC signaling.

In this specification, a frequency, a frame, a subframe, a resource, a resource block, a region, a band, a subband, a control channel, a data channel, a synchronization signal, various reference signals, various signals, or various messages in relation to NR (New Radio) may be interpreted as meanings used at present or in the past or as various meanings to be used in the future.

<5G NR (New Radio)>

Recently, the 3GPP has approved the "Study on New Radio Access Technology", which is a study item for research on next-generation/5G radio access technology. On the basis of the Study on New Radio Access Technology, discussions have been in progress for frame structures, channel coding and modulation, waveforms, multiple access methods, and the like for the new radio (NR). The NR is required to be designed not only to provide an improved data transmission rate as compared with the LTE/LTE-Advanced, but also to meet various requirements per detailed and specific usage scenario.

An enhanced mobile broadband (eMBB), massive machine-type communication (mMTC), and ultra-reliable and low latency communication (URLLC) are proposed as representative usage scenarios of the NR. In order to meet the requirements per usage scenario, it is required for designing the NR to have flexible frame structures, compared with the LTE/LTE-Advanced.

Since each usage scenario imposes different requirements for data rates, latency, coverage, etc., there arises a need for a method of efficiently multiplexing numerology-based (e.g., a subcarrier spacing (SCS), a subframe, a transmission time interval (TTI), etc.) radio resource units different from each other, as a solution for efficiently satisfying requirements according to usage scenarios through a frequency band provided to an NR system.

To this end, there have been discussions on i) methods of multiplexing numerologies having subcarrier spacing (SCS) values different from one another based on TDM, FDM or TDM/FDM through one NR carrier, and ii) methods of supporting one or more time units in configuring a scheduling unit in the time domain. In this regard, in the NR, a definition of a subframe has been given as one type of a time domain structure. In addition, as a reference numerology to define a corresponding subframe duration, a single subframe duration is defined as having 14 OFDM symbols of normal CP overhead based on 15 kHz subcarrier spacing (SCS), like the LTE. Therefore, the subframe of the NR has the time duration of 1 ms.

Unlike the LTE, since the subframe of the NR is an absolute reference time duration, a slot and a mini-slot may be defined as a time unit for actual UL/DL data scheduling. In this case, the number of OFDM symbols which constitutes a slot, a value of y, has been defined as y=14 regardless of the numerology.

Therefore, a slot may be made up of 14 symbols. In accordance with a transmission direction for a corresponding slot, all symbols may be used for DL transmission or UL transmission, or the symbols may be used in the configuration of a DL portion+a gap+a UL portion.

Further, a mini-slot has been defined to be made up of fewer symbols than the slot in a numerology (or SCS), and as a result, a short time domain scheduling interval may be configured for UL/DL data transmission or reception based on the mini-slot. Also, a long time domain scheduling interval may be configured for the UL/DL data transmission or reception by slot aggregation.

Particularly, in the case of the transmission or reception of latency critical data, such as the URLLC, when scheduling is performed on a slot basis based on 1 ms (14 symbols) defined in a frame structure based on a numerology having a small SCS value, for example, 15 kHz, latency requirements may be difficult to be satisfied. To this end, a mini-slot made up of fewer OFDM symbols than the slot may be defined, and thus the scheduling for the latency critical data, such as the URLLC, may be performed based on the mini-slot.

Figure 8:
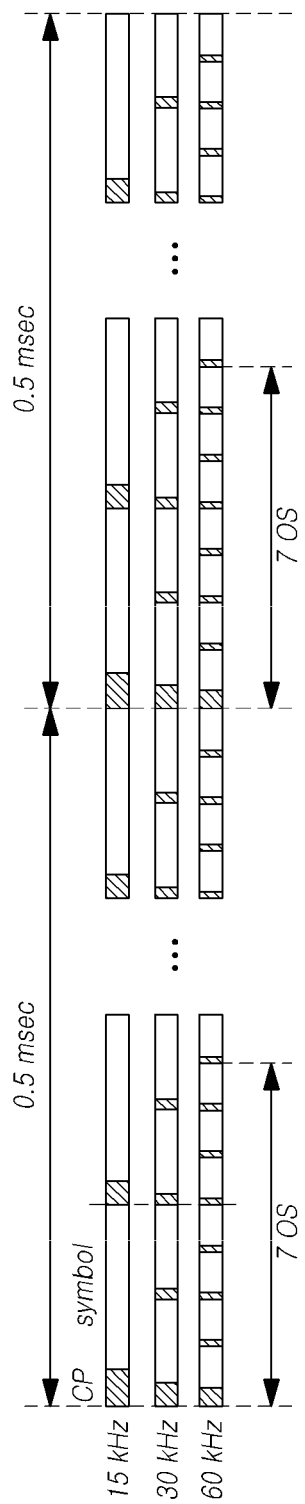
FIG. 8 is a view illustrating an example of symbol-level alignment in different SCSs to which at least one embodiment is applicable.

As described above, it is also contemplated to schedule the data according to the latency requirement based on the length of the slot (or minislot) defined by the numerology by supporting the numerology with the different SCS values in one NR carrier by multiplexing them in the TDM and/or FDM manner. For example, as shown in FIG. 8, when the SCS is 60 kHz, the symbol length is reduced to about ¼ of that of the SCS 15 kHz. Therefore, when one slot is made up of 14 OFDM symbols, the slot length based on 15 kHz is 1 ms whereas the slot length based on 60 kHz is reduced to about 0.25 ms.

Thus, since different SCSs or different TTI lengths from one another are defined in the NR, technologies have been developed for satisfying requirements of each of the URLLC and the eMBB.

<PDCCH>

In the NR and the LTE/LTE-A systems, the physical layer (L1) control information such as the downlink assignment DCI (DL assignment Downlink Control Information) and the uplink grant (UL grant) are transmitted and received through the PDCCH. A control channel element (CCE) is defined as a resource unit for the PDCCH transmission, and a control resource set (CORESET) as a frequency/time resource for the PDCCH transmission may be configured for each UE in the NR system. Also, each CORESET may be made up of one or more search spaces made up of one or more PDCCH candidates for the UE to monitor the PDCCH. The detailed description of the PDCCH in NR in 3GPP TS 38.211 and TS 38.213 is omitted for the sake of convenience, but it may be included in this disclosure.

<Wider Bandwidth Operations>

The typical LTE system supports scalable bandwidth operations for any LTC CC (component carrier). That is, according to a frequency deployment scenario, an LTE provider may configure a bandwidth of a minimum of 1.4 MHz to a maximum of 20 MHz in configuring a single LTE CC, and a normal LTE UE supports a transmission/reception capability of a bandwidth of 20 MHz for a single LTE CC.

Figure 9:
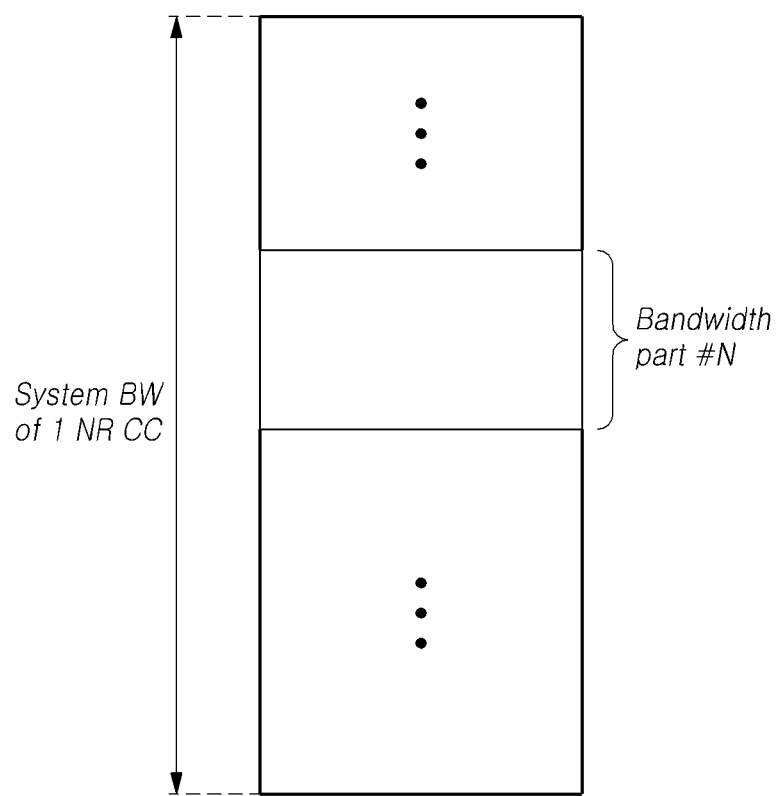
FIG. 9 is a view for explaining an NR time domain structure according to subcarrier spacing to which at least one embodiment is applicable.

However, the NR is designed to be able to support the UE of NR having different transmission/reception bandwidth capabilities through a single wideband NR CC. Accordingly, it is required to configure one or more bandwidth parts (BWPs) including subdivided bandwidths for an NR CC as shown FIG. 9, thereby supporting a flexible and wider bandwidth operation through configuration and activation of different bandwidth parts for respective UEs.

Specifically, one or more bandwidth parts may be configured through a single serving cell configured in terms of a UE in NR, and the UE is defined to activate one downlink (DL) bandwidth part and one uplink (UL) bandwidth part so as to use the same for uplink/downlink data transmission/reception in the corresponding serving cell. In addition, in the case where a plurality of serving cells is configured in the UE (i.e., the UE to which CA is applied), the UE is also defined to activate one downlink bandwidth part and/or one uplink bandwidth part in each serving cell so as to use the same for uplink/downlink data transmission/reception by utilizing radio resources of the corresponding serving cell.

Specifically, an initial bandwidth part for an initial access procedure of a UE may be defined in a serving cell; one or more UE-specific bandwidth parts may be configured for each UE through dedicated RRC signaling, and a default bandwidth part for a fallback operation may be defined for each UE.

It is possible to make a definition such that a plurality of downlink and/or uplink bandwidth parts are simultaneously activated and used according to the capability of the UE and the configuration of the bandwidth parts in a serving cell. However, definition was made in NR rel-15 such that only one downlink (DL) bandwidth part and one uplink (UL) bandwidth part are activated and used in an UE at an time.

<NR-U>

Unlike licensed bands, unlicensed bands can be used by any provider or person to provide wireless communication services within the regulations of respective countries, instead of being exclusively used by a specific provider. Accordingly, in order to provide NR services using the unlicensed bands, it is required to solve problems caused by co-existence with various short-range wireless communication protocols, such as Wi-Fi, Bluetooth, NFC, or the like, which is provided through unlicensed bands and problems caused by co-existence of NR providers and LTE providers.

Therefore, in order to avoid interference or collision between the respective wireless communication services when providing NR services through the unlicensed band, it is necessary to support an LBT (listen before talk)-based wireless channel access scheme in which a power level of a wireless channel or a carrier to be used is sensed before transmitting a radio signal, thereby determining whether or not the wireless channel or the carrier is available. In this case, if a specific wireless channel or carrier of the unlicensed band is in use by another wireless communication protocol or another provider, the NR services through the corresponding band will be limited, so that the QoS requested by the user may not be guaranteed in the wireless communication services through the unlicensed band, compared to the wireless communication services through the licensed band.

In particular, unlike typical LTE that supports an unlicensed spectrum only through carrier aggregation (CA) with a licensed spectrum, NR-U is based on deployment scenarios in the unlicensed band NR, such as a stand-alone NR-U cell or a dual-connectivity-based NR-U cell with an NR cell or an LTE cell in the licensed band. Thus, it is necessary to design a data transmission/reception method in order to satisfy a minimum QoS in the unlicensed band.

To this end, the present disclosure proposes a method and a device for transmitting and receiving the downlink and the uplink control channels of the UE and the base station in the NR-U cell.

Hereinafter, a method and a device for transmitting and receiving the downlink and the uplink control channels of the UE and the base station in the NR-U cell will be described with reference to the related drawings.

Figure 10:
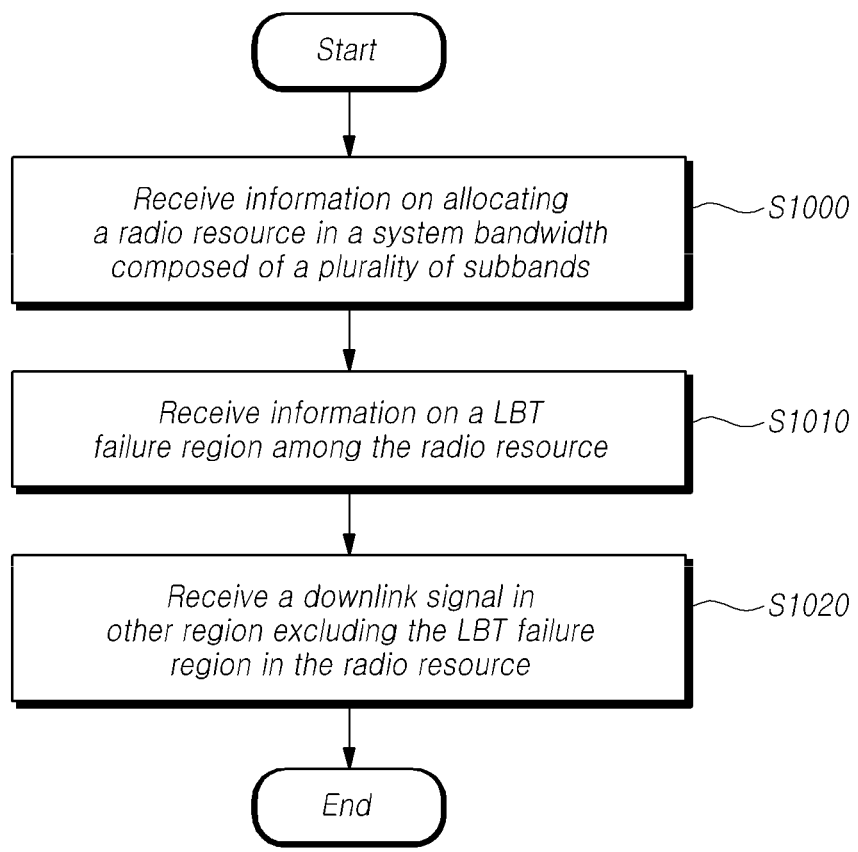
FIG. 10 is a flowchart illustrating a procedure for performing wireless communication using information on an LBT failure region in an unlicensed band of a UE according to one embodiment.

FIG. 10 is a flowchart illustrating a procedure of a user equipment for performing wireless communication using information on the LBT failure region in an unlicensed band according to one embodiment.

Referring to FIG. 10, the UE may receive information for allocating radio resources in a system band composed of a plurality of subbands at S1000.

For example, it is assumed that the system band in the unlicensed band is made up of the plurality of subbands corresponding to the LBT performance unit of 20 MHz. For example, it may be assumed a band of 100 MHz including five subbands. At least one of the plurality of subbands may be configured as a bandwidth part (BWP) of the UE.

The base station may allocate the radio resource to be used for transmitting the downlink signal or channel to the UE for its bandwidth part. The UE may receive allocation information for a resource block (RB) in the frequency domain and allocation information for a transmission start symbol and a duration in the time domain from the base station. As an example, the information for allocating the radio resource may be indicated through downlink control information (DCI).

Referring back to FIG. 10, the UE may receive information on a LBT (listen before talk) failure region among the radio resource at S1010.

As an example, the base station may transmit the information on the LBT failure region to the UE on transmission of the downlink signal or the downlink channel. That is, the information on a region prohibiting the downlink signal or the downlink signal channel from being transmitted due to an LBT failure among allocated regions may be explicitly instructed along with transmission of the downlink signal or the downlink channel.

Since the subband segment is determined at the time of cell band determination, the number and the type of subbands associated with one UE are determined at the time of configuring the BWP for the UE. At least one of the plurality of subbands that is made up of the system band may be associated with the BWP of the UE. In the downlink, the base station may perform the LBT on at least one subband associated with the BWP of the UE before starting transmission to the UE.

For example, the information about the LBT failure region may be provided through the downlink control information (DCI). The information on the LBT failure region may include information indicating whether the LBT succeeds for at least one subband associated with the BWP of the UE, that is, each of the subbands included in the radio resource allocated to the UE among the plurality of subbands.

In this case, the success or the failure of the LBT for each subband may be transmitted in a bitmap manner or a bitmap form by assigning a field value to the downlink control information. Also, if multiple start points are supported, information on a start point for starting transmission in the LBT failed subband may also be transmitted through the downlink control information (DCI).

For example, the DCI including the information on the LBT failure region may be the DCI carrying the original data transmission region and method. In this case, the corresponding DCI may include the information indicating whether the LBT succeeds for the subband together with scheduling information on downlink transmission.

Alternatively, the DCI including the information on the LBT failure region may be defined with a new DCI format to convey the information about the LBT failure region. In this case, the corresponding DCI may not include the scheduling information for the downlink transmission, and the corresponding DCI may include the information LBT success/failure for the subband. In this case, the length of the corresponding message may be fixed to the number of subbands associated with the BWP allocated to each UE, fixed to the number of associated subbands throughout the carrier band, or fixed to a specific value.

According to one example, the subbands and bits in the bitmap may be mapped on a one-to-one basis. Also, if the number of bits is greater than the number of subbands, the remaining bits may be aligned to length or to location, followed by padding to the remaining bits, or by filling in the significant bits repeatedly. Also, if the number of bits is less than the number of subbands, two or more subbands may be mapped to one bit. In this case, the number of subbands corresponding to one bit may be all configured to the same value or may be configured differently according to the number of bits and the number of subbands.

For example, if the number of bits is 5 and the number of subbands is 8, the first 3 bits may be mapped to two subbands, and the remaining 2 bits may be mapped to one subband. In this manner, when a plurality of subbands are instructed together, an LBT failure for only one subband may be determined to be an LBT failure for the entire subbands. Also, an LBT failure for all subbands may be determined to be an LBT failure for the entire subbands. Alternatively, an LBT failure for more than a predetermined ratio among the plurality of subbands may be determined to be an LBT failure for the entire subbands.

The corresponding DCI may be transmitted each time the downlink signal or the downlink channel is transmitted, or the corresponding DCI may be transmitted only when there is a failed subband for the LBT. In addition, the DCI may be scrambled with an RNTI associated with a specific UE and configured to receive only the specific UE. Alternatively, the DCI may be scrambled with an RNTI associated with a plurality of UEs and configured to receive all UEs that may access the corresponding CORESET (Control Resource Set). That is, the base station may transmit the DCI including the information on the LBT failure region through the UE-group common physical downlink control channel (PDCCH).

For example, a new DCI format 2-1 u similar to the DCI format 2-1 defined for the existing pre-emption indication may be defined. In this case, like the pre-emption indication field, the information field for the LBT failure region for the subband may be included in the payload and scrambled by the INT-RNTI (Interrupted transmission indication RNTI) in the same manner as the DCI format 2-1.

Alternatively, a new RNTI may be defined for use in the DCI, which does not use the INT-RNTI and contains information about the LBT failure region for the subband. For example, the newly defined RNTI may be referred to as an occupied subband indication RNTI(OSI-RNTI) or the like. However, this is not limited to the name as an example, and the newly defined RNTI may be referred to as another name.

The newly defined occupied subband indication RNTI may be preallocated to UE-groups using an unlicensed band made up of the plurality of subbands. The CRC bits of the DCI including the information on the LBT failure region for the subband may be scrambled with the occupied subband indication RNTI and transmitted through the PDCCH. Each UE in the UE-group receives the DCI through the corresponding PDCCH and may check the CRC of the DCI using the occupied subband indication RNTI. Accordingly, as described above, all UEs capable of accessing the corresponding CORESET may receive the information on the LBT failure region. In this case, the used PDCCH may be defined as a group common PDCCH (GC-PDCCH).

Referring back to FIG. 10, the UE monitors the downlink signal in other regions, except the LBT failure region, in the radio resource at S1020, and receives the downlink signal in the region at S1030.

The UE may monitor the downlink signal based on the allocation information on the radio resource and the information on the LBT failure region. That is, the UE may identify the remaining subband, except the subband in which the LBT fails, among the plurality of subbands made up of the radio resources allocated to reception of the downlink signal and the like. The UE may receive the downlink signal or the like from the base station through the remaining subbands.

For example, if multiple start points are supported in the unlicensed band, the base station may again perform the LBT for the LBT failed subbands during the transmission of the downlink signal. If the LBT is successful for a LBT failed subband, the base station may transmit information on whether to fail or succeed the LBT and the transmission start point for the corresponding subband through the DCI to the UE. Accordingly, after the transmission start point, the UE may monitor the subband in which the LBT succeeded during the downlink transmission and receive the downlink signal.

The UE according to embodiments of the present disclosure may efficiently perform the wireless communication in an unlicensed band when resource allocation is performed over the plurality of the subbands in the unlicensed band and a part of the subbands of an allocated resource is in an unavailable state or not available. The UE according to embodiments of the present disclosure may receive the information on the LBT failure region, which is a subband in an unavailable state when the resource allocation is performed over the plurality of the subbands in the unlicensed band.

Figure 11:
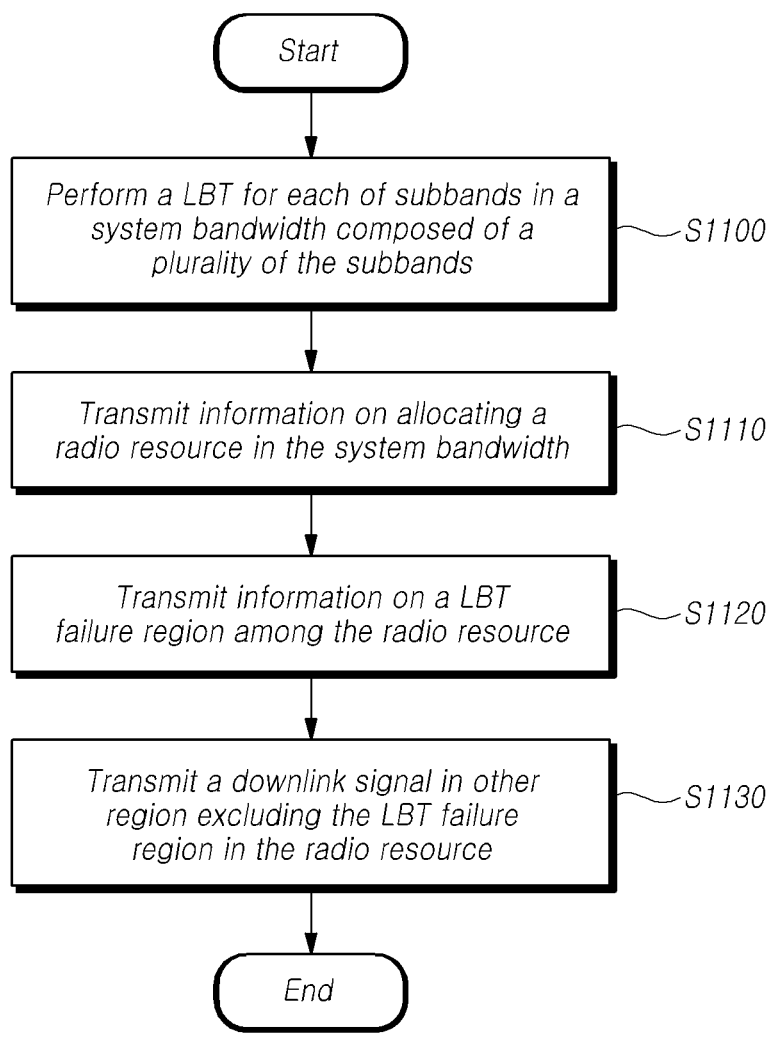
FIG. 11 is a flowchart illustrating a procedure for performing wireless communication using information on an LBT failure region in an unlicensed band of a base station according to the other embodiment.

FIG. 11 is a flowchart illustrating a procedure of a base station for performing wireless communication using information on an LBT failure region in an unlicensed band according to the other embodiment.

Referring to FIG. 11, the base station performs the LBT for each of subbands in the system bandwidth made up of the plurality of the subbands at S1100.

As an example, it is assumed that the system band in the unlicensed band is made up of the plurality of subbands corresponding to the LBT performance unit of 20 MHz. For example, it may be assumed a band of 100 MHz including five subbands. At least one of the plurality of subbands may be configured as a bandwidth part (BWP) of the UE.

In order to transmit the radio signal through the unlicensed band, the base station may perform the LBT procedure or the LBT to confirm whether or not the corresponding radio channel is occupied by another node. That is, the base station may perform the LBT procedure for at least one subband configured with the BWP of the UE in order to transmit the downlink signal or the downlink channel to the UE in the unlicensed band. As a result of performing the LBT procedure, if the subband of the corresponding unlicensed band is not occupied, the base station may transmit the PDCCH and the corresponding PDSCH using the subband to the UE.

Referring back to FIG. 11, the base station may transmit the information for allocating the radio resources in the system band made up of the plurality of subbands at S1110.

The base station may allocate the radio resource to be used for transmitting the downlink signal or channel to the UE for its bandwidth part. The base station may transmit the allocation information for the resource block (RB) in the frequency domain and the allocation information for the transmission start symbol and the duration in the time domain to the UE. For example, the information for allocating the radio resource may be provided (e.g., instructed, transmitted, delivered, informed) through downlink control information (DCI).

Referring back to FIG. 11, the base station may transmit the information on the LBT failure region among the radio resource at S1120.

For example, the base station may transmit the information on the LBT failure region to the UE on transmission of the downlink signal or the downlink channel. That is, the information on a region restricting transmission of the downlink signal or the downlink signal channel due to an LBT failure among allocated regions may be explicitly instructed along with transmission of the downlink signal or the downlink channel.

For example, the information about the LBT failure region may be instructed (e.g., provided, transmitted, delivered) through the downlink control information (DCI). The information on the LBT failure region may include the information indicating whether the LBT succeeds for at least one subband associated with the BWP of the UE, that is, each of the subbands included in the radio resource allocated to the UE among the plurality of subbands.

In this case, the success or the failure of the LBT for each subband may be transmitted in a bitmap manner or a bitmap form by assigning a field value to the downlink control information. Also, if multiple start points are supported, the information on a start point for starting transmission for the LBT failed subband may also be transmitted through the downlink control information (DCI).

As one example, the DCI including the information on the LBT failure region may be the DCI carrying the original data transmission region and method. In this case, the corresponding DCI may include the information indicating whether the LBT succeeds for the subband together with scheduling information on downlink transmission.

Alternatively, the DCI including the information on the LBT failure region may be defined with a new DCI format to convey the information about the LBT failure region. In this case, the corresponding DCI may not include the scheduling information for the downlink transmission, and the corresponding DCI may include the information LBT success/failure for the subband. In this case, the length of the corresponding message may be fixed to the number of subbands associated with the BWP allocated to each UE, fixed to the number of associated subbands throughout the carrier band, or fixed to a specific value.

For example, the subbands and the bits in the bitmap may be mapped on a one-to-one basis. Also, if the number of bits is greater than the number of the subbands, the remaining bits may be aligned to length or location, followed by padding to the remaining bits, or by filling in the significant bits repeatedly. Also, if the number of the bits is less than the number of the subbands, two or more the subbands may be mapped to one bit. In this case, the number of the subbands corresponding to one bit may be all configured to the same value or may be configured differently according to the number of the bits and the number of the subbands.

For example, if the number of the bits is 5 and the number of the subbands is 8, the first 3 bits may be mapped to two subbands, and the remaining 2 bits may be mapped to one subband. In this manner, when a plurality of the subbands are indicated together, an LBT failure for only one subband may be determined to be an LBT failure for the entire subbands. Also, an LBT failure for all subbands may be determined to be the LBT failure for the entire subbands. Alternatively, the LBT failure for more than a predetermined ratio among the plurality of the subbands may be determined to be the LBT failure for the entire subbands.

The corresponding DCI may be transmitted each time when the downlink signal or the downlink channel is transmitted, or the corresponding DCI may be transmitted only when there is a failed subband for the LBT. In addition, the DCI may be scrambled with an RNTI associated with a specific UE and configured to receive only the specific UE. Alternatively, the DCI may be scrambled with an RNTI associated with a plurality of UEs and configured to receive all UEs that may access the corresponding CORESET (Control Resource Set). That is, the base station may transmit the DCI including the information on the LBT failure region through the UE-group common physical downlink control channel (PDCCH).

According to one example, a new DCI format 2-1 u similar to the DCI format 2-1 defined for the typical pre-emption indication may be defined. In this case, like the pre-emption indication field, the information field for the LBT failure region for the subband may be included in the payload and scrambled by the INT-RNTI (Interrupted transmission indication RNTI) in the same manner as the DCI format 2-1.

Alternatively, a new RNTI may be defined for use in the DCI, which does not use the INT-RNTI and contains information about the LBT failure region for the subband. For example, the newly defined RNTI may be referred to as an occupied subband indication RNTI(OSI-RNTI) or the like. However, this is not limited to the name as an example, and the newly defined RNTI may be referred to as another name.

The newly defined occupied subband indication RNTI may be preallocated to UE-groups using an unlicensed band composed of the plurality of subbands. The CRC bits of the DCI including the information on the LBT failure region for the subband may be scrambled with the occupied subband indication RNTI and transmitted through the PDCCH. Each UE in the UE-group receives the DCI through the corresponding PDCCH and may check the CRC of the DCI using the occupied subband indication RNTI. Accordingly, as described above, all UEs capable of accessing the corresponding CORESET may receive the information on the LBT failure region. In this case, the used PDCCH may be defined as a group common PDCCH (GC-PDCCH).

Referring back to FIG. 11, the base station transmits the downlink signal in other regions, except the LBT failure region, in the radio resource at S1020, and receives the downlink signal in the region at S1130.

The base station may transmit the downlink signal based on the allocation information on the radio resource and the information on the LBT failure region. That is, the base station may identify the remaining subband except the subband in which the LBT fails, among the plurality of subbands composed of the radio resources allocated to reception of the downlink signal and the like. The base station may transmit the downlink signal or the like to the UE through the remaining subbands.

For example, if multiple start points are supported in the unlicensed band, the base station may again perform the LBT for the subbands in which the LBT failed during the transmission of the downlink signal. If the LBT is successful for a subband in which the LBT fails, the base station may transmit information on the LBT success and the transmission start point for the corresponding subband through the DCI to the UE. Accordingly, after the transmission start point, the UE may monitor the subband in which the LBT succeeded during the downlink transmission and receive the downlink signal.

The base station according to embodiments of the present disclosure may efficiently perform the wireless communication in an unlicensed band when resource allocation is performed over the plurality of the subbands in the unlicensed band and a part of the subbands of an allocated resource is in an unavailable state or not available. The base station according to embodiments of the present disclosure may transmit the information on the LBT failure region, which is a subband in an unavailable state when the resource allocation is performed over the plurality of the subbands in the unlicensed band.

Hereinafter, each embodiment for performing the wireless communication in consideration of the LBT failure region in an unlicensed band in the NR will be described with reference to related drawings in detail.

In order to transmit the radio signal through the unlicensed band, the base station may perform the LBT procedure or the LBT to confirm whether or not the corresponding radio channel is occupied by another node.

As a result of performing the LBT procedure, if the subband of the corresponding unlicensed band is not occupied, the base station may transmit the PDCCH and the corresponding PDSCH using the subband to the UE.

Similarly, in order to transmit an uplink signal in the unlicensed band, the UE needs to perform the LBT for the unlicensed band before transmitting the uplink signal.

Figure 12:
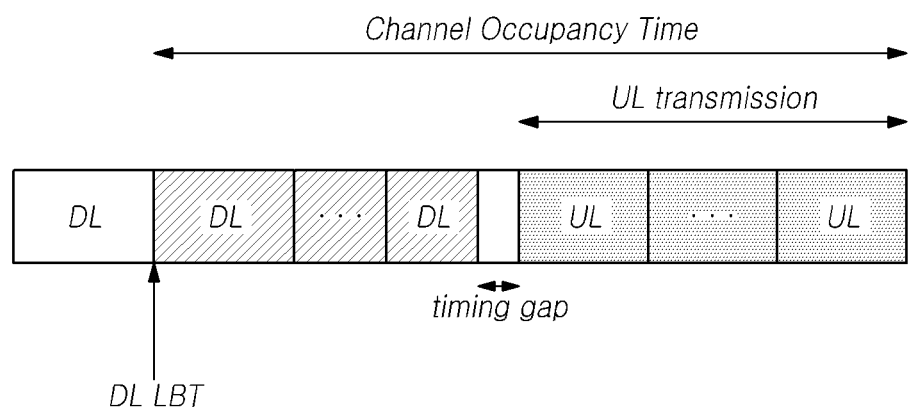
FIG. 12 is a diagram for explaining an LBT for wireless communication in a unlicensed band according to an exemplary embodiment of the present disclosure.

FIG. 12 is a diagram for explaining an LBT for wireless communication in the unlicensed band according to an exemplary embodiment of the present disclosure.

For example, it may be defined that a base station instructs a UE to perform LBT at the time of PUCCH transmission resource allocation or PUSCH transmission resource allocation, or at the corresponding PUCCH transmission or PUSCH transmission for the UE. The UE may transmit UCI (Uplink Control Information) such as HARQ ACK/NACK feedback information or CQI/CSI reporting information to the base station through the PUCCH or the PUSCH.

In this regard, in the NR, time resources and frequency resources, which are PUCCH resources for transmitting the HARQ feedback, may be instructed by the base station through the uplink assignment DCI or the uplink grant DCI. Alternatively, the PUCCH resource for transmitting the HARQ feedback may be semi-statically configured via RRC signaling. In particular, in the case of time resources, a value of K1, which is a timing gap value between the PDSCH reception slot and the corresponding HARQ feedback information transmission slot, may be transmitted to the UE through the DL assignment DCI or the RRC signaling.

The PUCCH resource for the CQI/CSI reporting may also be allocated to the UE through the DL assignment DCI or the RRC signaling.

Referring to FIG. 12, dashed lines show that the downlink transmission is performed through the unlicensed band at the later point when the downlink LBT (DL LBT) for the downlink transmission is successful in the base station. For example, the downlink transmission may be transmission of a downlink channel or transmission of a downlink signal indicating the uplink transmission. In FIG. 12, the downlink transmission is denoted by DL, and the uplink transmission is denoted by UL.

For example, the downlink transmission DL and the uplink transmission UL may correspond to i) PDSCH transmission and PUCCH transmission for the HARQ feedback thereto, ii) DCI for requesting the CQI/CSI reporting and PUCCH for the reporting thereof, or iii) DCI for transmitting uplink scheduling information for PUSCH and PUSCH transmission therefor. In this case, the timing gap K1 occurs between the downlink transmission DL and the uplink transmission UL.

For example, when the downlink signal or the downlink channel according to downlink transmission indicates the PUCCH transmission in an NR-U cell of the unlicensed band, the UE basically performs the LBT for the PUCCH transmission preferentially according to the regulation of the unlicensed spectrum and determines whether to transmit the PUCCH at the point indicated according to the result of the LBT. If the corresponding radio channel is occupied by another node as the result of the LBT, that is, if an LBT failure occurs, the corresponding UE may not be able to perform the PUCCH transmission at the indicated time.

However, if a channel occupancy time (COT) of the base station includes the DL assignment DCI transmission slot including the PUCCH resource allocation information and the PUCCH transmission indication information or the PDSCH transmission slots according to the corresponding DL assignment DCI, and the PUCCH transmission slot thereto, the PUCCH transmission may be performed in the corresponding UE without performing the LBT. It is because that the unlicensed band is already occupied for the downlink transmission to the UE by the base station, and not occupied by another node. That is, according to the configuration of the COT and the value of the K1 of the base station, the HARQ feedback transmission over the PUCCH is possible without LBT at the corresponding UE.

Similarly, it may be assumed that a timing gap value between i) a slot to which the DL assignment DCI is transmitted and ii) slots in which the PUCCH including the CQI/CSI reporting information is transmitted is M. When the CSI/CQI reporting via the PUCCH is indicated through the DL assignment DCI, the CQI/CSI reporting over the PUCCH is possible without LBT at the corresponding UE according to the configuration of the COT and the value of the M of the base station.

Similar to the case of the PUCCH, it may be assumed that a timing gap value between i) a slot to which the UL grant DCI is transmitted and ii) slots in which the PUSCH is transmitted is K2. The value of the time gap K2 may be semi-statically configured via RRC signaling or dynamically configured via the UL grant DCI by the base station. Also in this case, when the channel occupancy time (COT) of the base station includes the UL grant DCI transmission slot including the PUSCH resource allocation information and the PUSCH transmission slot thereto, the PUSCH transmission may be performed in the corresponding UE without performing the LBT.

In this regard, according to an embodiment of the present disclosure, a base station may configure an LBT scheme for performing the LBT when transmitting the PUCCH or the PUSHC at an UE, and the base station may instruct it to the UE. For example, the LBT scheme may be divided into a plurality of schemes according to at least one of whether to perform the LBT, whether to perform a random back off procedure, and a random backoff time. In this disclosure, the method of performing the LBT is referred to as an 'LBT scheme', but is not limited thereto. The LBT scheme for performing the LBT may be variously referred to as the LBT category, but the disclosure is not limited thereto.

For example, the LBT scheme may include a first LBT scheme that does not perform the LBT, a second LBT scheme that performs the LBT but does not perform the random back off procedure, a third LBT scheme in which the LBT and the random back off procedure is performed but the off-time interval is fixed, and a fourth LBT scheme in which the LBT and the random back off procedure is performed but the off-time interval is variable.

For example, the base station may directly instruct the UE whether to perform the LBT for the uplink transmission through physical layer (L1) control signaling. Specifically, the LBT indication information for instructing whether to perform the LBT for the uplink transmission of the UE may be defined to be included within the DL assignment DCI format for transmitting the PDSCH scheduling control information.

For example, the LBT indication information may be 1-bit indication information bit. In this case, it is possible to define whether or not to perform the LBT at the corresponding UE according to the bit value (0, 1) of the LBT indication information when the UE corresponding to the DL assignment DCI format transmits the PUCCH. In this case, the bit value of the LBT indication information may mean to distinguish the first LBT scheme from the remaining LBT schemes among the LBT schemes described above.

As another example, the LBT indication information may be 2-bit indication information. In this case, it is possible to define whether or not to perform the LBT at the corresponding UE according to the bit value (00, 01, 10, and 11) of the LBT indication information when the UE corresponding to the DL assignment DCI format transmits the PUCCH. In this case, the bit value of the LBT indication information may mean to identify the first LBT scheme to the fourth LBT scheme among the LBT schemes described above.

In this case, the PUCCH transmission of the UE corresponding to the above described DL assignment DCI format may be the PUCCH transmission for the HARQ feedback information transmission of the UE according to the PDSCH reception of the UE based on the corresponding DL assignment DCI format. The PUCCH transmission of the UE corresponding to the DL assignment DCI format may be the PUCCH transmission for the CQI/CSI reporting when the CQI/CSI reporting is triggered by the corresponding DL assignment DCI format.

The LBT indication information may be defined to be included within the UL grant DCI format for transmitting the PUSCH scheduling control information.

For example, the LBT indication information may be 1-bit indication information bit. In this case, it is possible to define whether or not to perform the LBT at the corresponding UE according to the bit value (0, 1) of the LBT indication information when the UE corresponding to the UL grant DCI format transmits the PUCCH. In this case, the bit value of the LBT indication information may mean to distinguish the first LBT scheme from the remaining LBT schemes among the LBT schemes described above.

As another example, the LBT indication information may be 2-bit indication information. In this case, it is possible to define whether or not to perform the LBT at the corresponding UE according to the bit value (00, 01, 10, and 11) of the LBT indication information when the UE corresponding to the UL grant DCI format transmits the PUCCH. In this case, the bit value of the LBT indication information may mean to identify the first LBT scheme to the fourth LBT scheme among the LBT schemes described above.

In this case, the PUCCH transmission of the UE corresponding to the above described UL grant DCI format may be the PUCCH transmission for the uplink data transmission or the UCI transmission.

According to another embodiment, it will be defined that whether to perform the LBT scheme for the uplink transmission in the UE or the type of LBT scheme may be determined based on the timing gap value between the downlink transmission indicating the uplink transmission and the corresponding uplink transmission as shown in FIG. 12.

For example, if the timing gap value is smaller than an threshold value, it is possible to define that the indicated PUCCH or PUSCH may be transmitted without LBT at the corresponding UE. Alternatively, if the timing gap value is greater than the corresponding threshold, it is possible to define that the corresponding PUCCH or PUSCH may be transmitted after the LBT is performed at the corresponding UE.

For example, the threshold may be determined by the COT value in the corresponding NR-U, or the threshold may be configured based on either cell-specific RRC signaling, UE-specific RRC signaling according to the COT by the base station, or the cell-specific RRC signaling or the UE-specific RRC signaling regardless of the COT by the base station.

In addition, the threshold may be defined as a single threshold for each uplink transmission case, or the threshold may be defined as a threshold different from each other and then configured through the specific RRC signaling or the UE-specific RRC signaling.

According to the above procedure, it is possible to determine the LBT scheme to be performed in order to transmit the uplink signal in the unlicensed band and to transmit the uplink signal in the unlicensed band according to the determined LBT scheme.

The present disclosure provides a transmission allocation and control method in a 3GPP NR system in which channel availability is independent of the transmitter/receiver's intention. In particular, the present disclosure provides a method for transmitting a large capacity packet in the NR-based access to unlicensed spectrum (NR-U) system environment using a common channel as a transmission space.

In the typical 3GPP LTE, the license-assisted access (LAA) system was proposed as one method of using a unlicensed band. The LAA system operates a control channel through a license band and operates a data channel through the unlicensed band. In addition, studies are underway to introduce the NR-U system to transmit and receive the data or the control information in the unlicensed band, as a new feature.

As described above, in the case of the unlicensed band, it is checked whether there is another device occupying a channel band to be transmitted through a LBT procedure. Then, the wireless communication may be started only when it is empty. In this case, since it is inefficient to perform the LBT procedure on all frequency components, the occupancy of the corresponding band is generally investigated in a unit of 20 MHz, and the wireless communications are performed within the corresponding band.

In the case of the downlink, if a channel is not empty, a transmitting base station should not perform resource allocation. On the other hand, in uplink environment, the transmitting UE may be unable to perform uplink transmission to an allocated resource region according to LBT failure of resource allocated by the receiving base station. It is generally assumed that reception is failed in the base station in the case where such a transmission failure occurs, and the retransmission is performed. In this case, there are proposed the detailed method that a block is not included in a soft combine during decoding a received block.

However, for the NR system, scenarios using a band larger than 20 MHz as an LBT unit are considered. Accordingly, there are discussions for developing operation methods in the band of 20 MHz or more in the NR-U. In this case, there are a plurality of LBT intervals divided into 20 MHz units, and each of the plurality of LBT intervals may be divided into subbands within one band.

As described above, since the LAA applied to 3GPP LTE has the same channel bandwidth and LBT unit, it is only necessary to determine whether the entire channel can be used. However, there are the plurality of LBT intervals such as the plurality of subbands in the case of the band larger than 20 MHz as in the NR system, and availability of each interval may vary. Even if the LBT fails in some regions, that is, even if the channel is not available in some regions, the UE may secure the band to be used for transmission/reception in which the LBT is still successful. However, when the LBT fails in some regions, a method of using the remaining band succeeding in the LBT for the transmission/reception has not yet been introduced.

In this regard, it is mainly discussed a method of allocating the uplink/downlink scheduling resource for each subband. This method may perform the NR transmission and reception in the unit of 20 MHz and merge it in a higher layer similar to the CA (carrier aggregation). This method is similar to the multiple scheduling method because of performing the resource allocation to the plurality of subbands with only one control channel. However, since this method requires one transmission block to operate unconditionally within the unit of 20 MHz, there may be a significant restriction in large-capacity transmission, especially in environments using high numerology.

In the following, the present disclosure provides an efficient transmission method in a case where the resource allocation is performed over the plurality of subbands in the NR-U environment and some subbands of the allocated resources are in an unavailable state. Particularly, the present disclosure relates to a method and a system for identifying a transmission failure caused by noise or the like and a transmission failure caused by the LBT failure at a receiving side or a receiver and delivering the related information to the receiver in order to obtain higher decoding performance by providing accurate reliability of information at a later decoding time. In addition, the present disclosure provides a method of configuring a transport block considering the LBT failure region, on the assumption that transmitting the related information to the LBT failure region is transmitted.

The present disclosure provides a method of transmitting the LBT failure region in the corresponding transmission, a method of transmitting the LBT failure region in retransmission, and a method of configuring the transmission block in accordance with the LBT failure region. The terms used in this disclosure may be replaced by other terms having substantially the same meaning in the following description, and the scope of the present disclosure is not limited by the terms used.

Figure 13:
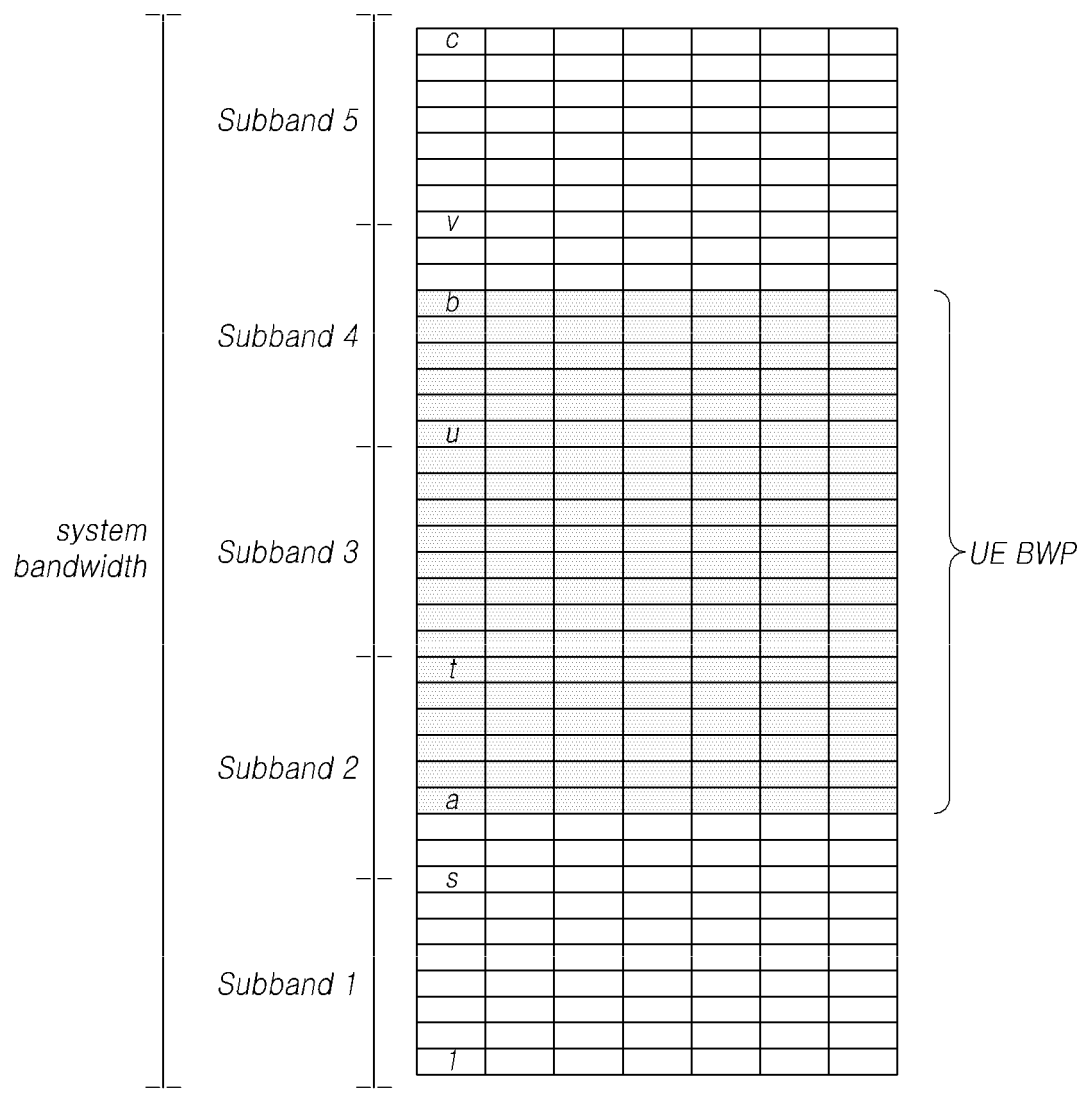
FIG. 13 is a diagram for explaining a sub-band of a unlicensed band according to an embodiment.
Figure 14:
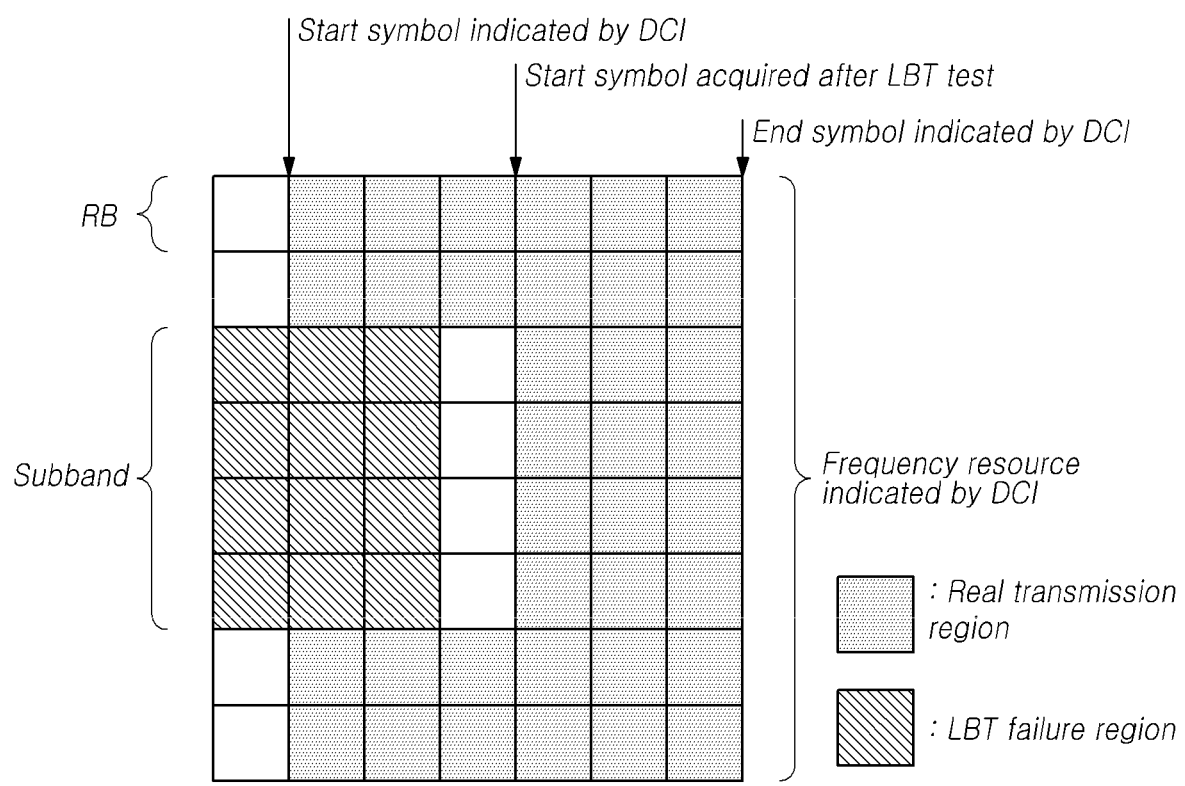
FIG. 14 is a view for explaining a transmission region in a case where multiple start points are supported in a unlicensed band according to the embodiment.
Figure 16:
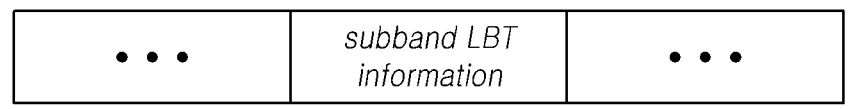

FIG. 13 is a diagram for explaining a sub-band of a unlicensed band according to an embodiment. FIG. 14 is a view for explaining a transmission region in a case where multiple start points are supported in a unlicensed band according to the embodiment. FIGS. 15 and 16 are diagrams for explaining a DCI format including information on an LBT failure region according to the embodiment.

As shown in FIG. 13, it is assumed that the system band is made up of the plurality of subbands, which is the LBT performance unit. For example, it is assumed that the system band may a band of 100 MHz made up of five subbands. It is assumed that the corresponding band is made up of c resource blocks (RBs) represented by numbers from 1 to c, and a band represented by numbers from a to b is made up of a bandwidth part (BWP) of the UE. Further, it is assumed that the numbers of RBs (e.g., each subband) is s, t, u, v from the bottom, respectively. In this case, it is assumed that there is a relationship of $1 \leq s \leq a < t < u < b \leq v < c$ as shown in FIG. 13. In FIG. 13, each of the values of s and a, b and v may be different from each other, but it is not limited thereto. Each of the values of s and a, b and v are equal to each other.

As shown FIG. 13, one slot may have a length of 7 and a time length defined as one slot is used as a scheduling unit in the NR. When the resource is allocated, a specific start point and a length are indicated by a control message. For example, in FIG. 13, when all one slot is used, the start point=1 and the length=7 are indicated by the control message. In this case, a pair of available start points and lengths may be predefined to reduce the size of the control message. In addition, it is possible to support more various starting points and lengths in consideration of the case where there is enabled the use of the corresponding band from the middle depending on the success of the LBT in the unlicensed band.

The configuration of the system band, the subband and the BWP for the UE shown in FIG. 13 are examples for convenience of explanation, but it is not limited thereto. For example, the number of RBs or the number of subbands in the system band, the number of constituent RBs, or the BWP of the UE may be configured differently depending on the case.

For example, in the present disclosure, it is assumed that each scenario is supported to a predetermined start point and length, as well as a different start point and length from that of other block allocated together.

For example, referring to FIG. 14, the radio resource allocated to the UE is indicated by the DCI. The DCI may indicate the start symbol in the time domain and the resource blocks (RBs) in the frequency domain as the transmission domain. It is assumed that the LBT fails for the subband made up of 4 RBs in the middle of the frequency domain. In this case, if the LBT succeeds from the 5th symbol for the corresponding subband, the 5th symbol for the corresponding subband may be transmitted to the UE as the starting point of the downlink transmission.

Hereinafter, specific embodiments according to the present disclosure will be described based on the transmission region and the contents described in reference with FIG. 14.

According to the first embodiment, the information on the LBT failure region may be transmitted from the transmitting side when the signal is transmitted. In this case, a transmitting side may explicitly or implicitly transmit the information on a region that may not be transmitted due to the LBT failure among the allocated regions simultaneously with the transmission of the signal. Hereinafter, the downlink and uplink environments will be described separately, and the methods will be described again in terms of explicitly or implicitly transmitting the information on the LBT failure region. The methods may be mutually independent and may optionally be applied as needed.

For example, the information on the LBT failure region may be explicitly indicated in the case of downlink transmission. Since the subband segment is determined at cell band determination, the number and type of subbands associated with one UE are determined at the time of the configuration of the BWP. For example, three subbands (subbands 2 through 4) are associated with the BWP of the UE as shown FIG. 13. In the downlink, the base station may perform the LBT for the three subbands before starting transmission to the corresponding UE. In this case, the success or the failure of the LBT for each subband may be transmitted in the bit map manner by assigning a field value to the downlink control information (DCI). Also, if multiple start points are supported, the starting point to be transmitted for the subband for which the LBT failed may also be transmitted.

In this case, the DCI including the information on the LBT failure region may be the DCI carrying the initial data transmission region and method. In this case, referring to FIG. 15, the corresponding DCI may include the LBT success/failure information for the subbands together with the scheduling information for the downlink transmission. However, the present disclosure is not limited thereto, and the location or the name of the field including the LBT success/failure information for the subband may be defined differently.

Alternatively, the DCI including information about the LBT failure region may be another DCI of a new format transmitted at a location associated with the data transmission location. In this case, referring to FIG. 16, the corresponding DCI may include the LBT success/failure information on the subbands without the scheduling information for the downlink transmission. However, the present disclosure is not limited to this, and the location or the name of the field including the LBT success/failure information for the subband may be defined differently.

The transmission of information on the LBT success/failure information for each subband may be performed as follows. For example, a new DCI format including the subband-based LBT success/failure information may be defined. In this case, the length of the corresponding message may be fixed to the number of subbands associated with the BWP allocated to each UE, fixed to the number of associated subbands throughout the carrier band, or fixed to a specific value.

Accordingly, the mapping between the subbands and the bits in the bitmap may be a one-to-one mapping between them. Also, if the number of bits is greater than the number of the subbands, the remaining bits may be aligned to length or location, followed by padding to the remaining bits, or by filling in the significant bits repeatedly. Also, if the number of the bits is less than the number of the subbands, two or more the subbands may be grouped and mapped. In this case, the number of the subbands corresponding to one bit may be all configured to the same value or may be configured differently according to the number of the bits and the number of the subbands.

As mentioned above, if the number of the bits is 5 and the number of the subbands is 8, the first 3 bits may be mapped to two subbands, and the remaining 2 bits may be mapped to one subband. In this manner, when a plurality of the subbands are indicated together, an LBT failure for only one subband may be determined to be an LBT failure for the entire subbands. Also, an LBT failure for all subbands may be determined to be the LBT failure for the entire subbands. Alternatively, the LBT failure for more than a predetermined ratio among the plurality of the subbands may be determined to be the LBT failure for the entire subbands.

The corresponding DCI may be transmitted each time the downlink signal or the downlink channel is transmitted, or the corresponding DCI may be transmitted only when there is a failed subband for the LBT. In addition, the DCI may be scrambled with an RNTI associated with a specific UE and configured to receive only the specific UE. Alternatively, the DCI may be scrambled with an RNTI associated with a plurality of UEs and configured to receive all UEs that may access the corresponding CORESET (Control Resource Set).

As mentioned above, a new DCI format 2-1 u similar to the DCI format 2-1 defined for the typtical pre-emption indication may be defined. In this case, like the pre-emption indication field, the information field for the LBT failure region for the subband may be included in the payload and scrambled by the INT-RNTI (Interrupted transmission indication RNTI) in the same manner as the DCI format 2-1.

Alternatively, a new RNTI may be defined for use in the DCI, which does not use the INT-RNTI and contains information about the LBT failure region for the subband. For example, the newly defined RNTI may be referred to as an occupied subband indication RNTI(OSI-RNTI) or the like.

The newly defined occupied subband indication RNTI may be preallocated to UE-groups using an unlicensed band composed of the plurality of subbands. The CRC bits of the DCI including the information on the LBT failure region for the subband may be scrambled with the occupied subband indication RNTI and transmitted through the PDCCH. Each UE in the UE-group receives the DCI through the corresponding PDCCH and may check the CRC of the DCI using the occupied subband indication RNTI. Accordingly, as described above, all UEs capable of accessing the corresponding CORESET may receive the information on the LBT failure region. In this case, the used PDCCH may be defined as a group common PDCCH (GC-PDCCH).

As another example, the information on the LBT failure region may be implicitly indicated in the case of the downlink transmission. For example, a reference signal such as a DMRS may be used to indicate an LBT failed subband without changing the typical DCI format. To this end, either the typical DMRS or the CSI-RS may be utilized, or a new reference signal may be defined for indicating the LBT failed subband.

When the reference signal is used, the detected value of the reference signal in a specific subband is less than a predetermined threshold value in the receiving side. In this case, a receiving side may determine that the transmission is not performed even if the corresponding subband is allocated by the DCI. Alternatively, the reference signal of the transmission region may be changed for higher detection reliability. For example, the reference signal carried in a succeeding subband after a failed subband in the LBT may include the number of previously failed subbands as a parameter.

For example, it is assumed that the reference signals A to J are transmitted to the subbands 1 to 10 in order. When the LBT fails in the subbands 3, 4, 5 and 9 among the subbands 1 to 10, the reference signals A and B are assigned to subbands 1 and 2 as they are, and the reference signal C is transmitted to the subbands 6. The reference signals D and E may be assigned to the subbands 7 and 8, or the reference signals G or H may be assigned to subbands 7 and 8. The reference signals F or I may be assigned to the subband 10. Since the reference signal C instead of the reference signal F is transmitted to the subband 6, the receiving side may determine that the LBT failure for the subbands 3, 4, and 5 has occurred.

Also, when the temporal position of the reference signal such as the front-loaded DMRS may refer to the start point of the transmission region, the position of the reference signal may be determined as the transmission start point. Therefore, the temporal position in which a new transmission is started in a subband in which the LBT has failed may be transmitted using the reference signal such as the front-loaded DMRS. This implies that the information about the LBT failure region is indicated explicitly and at the same time implicitly, so that the blind detection of the reference signal may be performed only for the LBT failure region, thereby reducing the complexity.

As another example, the information on the LBT failure region may be explicitly indicated in the case of the uplink transmission. For example, as in the case of the downlink transmission described above, the information on the LBT failure region may be transmitted in a bit map form using a field in the uplink control information (UCI) transmitted through the PUSCH. Since the UCI in the PUSCH is piggybacked in the transport block, no information may be acquired if the transport block is not decoded. In general, if there is an unexpected shortage of transmission space, there is a high probability that the transmission block itself will not be properly decoded.

Therefore, even if an LBT failure occurs in the vicinity of the uplink transmission block, a PUCCH resource of a type to be decoded sufficiently is configured at a predetermined position, so that the information on whether to fail the LBT and the new transmission start point may be transmitted through the PUCCH. For example, the last OFDM symbol among the uplink transmission resources may be configured as a PUCCH space for transmitting the information on whether to fail the LBT in the bitmap manner, and the information on whether to fail the LBT may be transmitted through the PUCCH space. At this time, each PUCCH is repeatedly transmitted for each subband, so that the success of the LBT for the entire subband may be known even if only the PUCCH in one subband is received at the receiving side.

As another example, the information on the LBT failure region may be implicitly indicated in the case of the uplink transmission. In this case, as in the downlink transmission, the uplink DMRS or other predetermined reference signal may be used to implicitly transmit the information on the subband failing the LBT.

According to the second embodiment, the transmitting side may transmit the information on the LBT failure region upon retransmission.

In this case, a transmitting side may be able to transmit the information on a region that may not be transmitted due to the LBT failure among the allocated regions at the time of the retransmission. Similar to the first embodiment, this case may also be considered in each of the downlink and the uplink. At the time of retransmission, if the additional start point is supported, the corresponding information together with the information on the LBT failure region may also be transmitted.

For example, in the case of downlink transmission, the information related to the LBT failure region may be transmitted in various forms because there is no DCI-related time constraint during retransmission. Accordingly, all the methods proposed in the downlink transmission of the first embodiment may be also used. In this case, the difference from the first embodiment is that the transmission time of the information is the retransmission time instead of the transmission time. In addition, it may be transmitted by the scheme to indicate the flushing of the associated block with code block group flushing out information (CBGFI) or the like after configuring a code block group (CBG) in a format aligned with the subbands in the same manner as in the case of pre-emption.

As another example, in the case of the uplink transmission, the related information may be included in the UCI of the PUSCH at the time of retransmission in addition to the method of the first embodiment. In particular, there may be transmitted the information such as multiple start points by the UCI or the like.

According to the third embodiment, the transport block may be configured according to the LBT failure area.

Basically, not a base station but an external regulation may configure a range of a subband. A subcarrier unit supported by the NR is not a divisor of 20 MHz. Therefore, the number of RBs involved in one subband range is not always constant and does not coincide with the start and the end ranges of the frame. In addition, when the subband corresponding to the LBT failure is being used by another node, the transmitting side should perform the transmission considering the guard band of the adjacent subband.

For example, if the subband 3 is being used in FIG. 13, the UE may allocate only the region of the transmission from a to t−g and from u+g to b for a predetermined specific value g. In this case, the specific value g may vary according to the subcarrier unit used or the reference frequency range, and is generally specified in the related specification and collectively transmitted to the UE through the cell-specific RRC signaling. In any case, at the time of performing the transmission, the base station and the UE may accurately recognize the range of the RB which should not be used or not used when the LBT of the specific subband fails, and interpret the LBT failure information.

At this time, the configuration of the guard band may be a unit of RB or a unit of RE (resource element) in the RB. This environment may also be standardized or may be determined by the base station according to the configuration of the BWP. In particular, when the bandwidth loss is large due to the configuration of the RB unit guard band such as the configuration of a high subcarrier unit, the configuration of the guard band may be determined in RE units.

In a case where the configuration of the guard band may be a unit of RB or a unit of RE (resource element) in the RB, the boundary determined as a result of the LBT may not coincide with the scheduling unit. It may happen that the scheduling may not be performed accurately according to the range to be transmitted due to the LBT failure. In particular, this constraint may have a large effect on a wide bandwidth in which the size P of the RB group (RBG) becomes large. In the NR, the size P of up to 16 or more may be configured, and if an existing scheduling unit is maintained in an RA type-0 environment that performs bitmap operations in units of P, it is possible that more than 15 RBs may not be scheduled. For example, in the case of RA type-1 that supports the scheduling in units of 1 RB expressed in successive units, for example, when the LBT fails in the subband 3 within the BWP in FIG. 13, It may happen that the entire band above or below the subband 3 should be abandoned in order to schedule the remaining band according to the RA type-1.

If it is possible to transmit the information on whether the LBT fails in advance, the following process may be introduced to solve this problem. For example, the scheduling may be freely performed in the previous manner without excluding a range where the transmission is not performed due to the LBT failure in the scheduling area. For example, even if the LBT of the subband 3 fails in the above example, the base station may still schedule all of the ranges from a to b. At the same time, if the information on the LBT failure is simultaneously transmitted, the UE is able to recognize that the transmission region is not from a to b but from a to t−g, and from u+g to b, and it may be determined that resources are allocated only to the corresponding RB. Therefore, the transmitting side may generate the transmission block according to the range, except the LBT failure range, in advance.

However, since the LBT and the restriction of the transmission range due to the LBT failure is immediately performed, the processing time such as the calculation of the actual transmission range based on the result, the transmission block size, the determination of the MCS and the like may not be sufficiently secured. Therefore, the transmission block generation itself may be performed in advance and the signal to be transmitted in the LBT failure region may be punctured and transmitted. The two transmission methods described above may be selectively applied in the same situation. There is a need for a method of indicating in advance which method was selected, or delivering it after the selection.

Hereinafter, it is assumed that the LBT succeeds in the subbands 2 and 4 and the LBT fails in the subband 3 as shown in FIG. 13.

For example, the transmission block may be generated according to the range excluding the LBT failure range in the downlink environment. The PDSCH may be composed of RBs of size (t−g−a+1)+(b−u−g+1) considering the guard band, except for the subband 3 in which the LBT fails in the BWP configured in the UE. Accordingly, the transport block is generated according to the size of the transmission region, and the generated transport block is mapped to RB resources from a to t−g and from u+g to b, which are transmission resources except for a frequency region that cannot be transmitted due to the LBT failure. The transmitting side may schedule the transmission resource in a range including the entire region to be actually transmitted and transmit information on whether to fail the LBT in the specific subband. At the receiving side, the transmission regions from a to t−g and from u+g to b may be extracted to the RB range in which the actual transmission has been performed, and the decoding is performed in the RB range.

As another example, the LBT failure region may be punctured and transmitted in the downlink environment. The PDSCH is made up of b−a+1 RB, which is the original BWP size, and the transport block may be generated according to the size of the transmission region. In this case, a value corresponding to the resource of the LBT failed subband is punctured and mapped to the transmission resource. The transmitting side may schedule the entire area, and the result of performing the subband LBT may be transmitted. The receiving side may receive the RBs from a to b, decides that the received value in the range from t−g to b+g is worthless, ignores it and perform decoding.

On the other hand, it is also possible to introduce a start position to start the transmission from the middle even if the LBT fails. In this case, as shown in FIG. 14, in the LBT failure band, resources after the point in time when the availability is secured and the transmission may be started may not be punctured. In decoding, the receiving side may refer to the information transmitted to the corresponding region implicitly or later on the basis of the information on the start position.

As another example, the transport block may be generated according to the range excluding an LBT failure range in the uplink environment. The description in the downlink environment described above may basically be applied also in the uplink environment. However, in the case of the uplink environment, if the scheduling region itself cannot be controlled and the information on whether to fail the LBT cannot be transmitted before the decoding of the transport block such as the UCI in the PUSCH, the uplink environment is different from the downlink environment in that the base station as the receiving side may blindly detect whether to fail the LBT at first, and the complexity increases as the number of the involved subbands increases. Therefore, as described above in the first embodiment, it is possible to reduce the complexity of the base station by separately transmitting the information on the LBT failure through the DMRS or the PUCCH.

As another example, an LBT failure region may be punctured and transmitted in the uplink environment. Also in this case, the description in the downlink environment described above may basically be applied in the uplink environment. The base station may receive the information on the LBT failure when the initial decoding fails and increase the decoding performance or request retransmission only for the required portion. At this time, an additional operation indicating retransmission may be defined so that retransmission can be performed with the same value as the existing transmission value.

As another example, whether or not to perform the pre-creation or puncturing of the transport block may be indicated or delivered. As in the above example, whether to perform the transmission in either the pre-generation or the puncturing may be determined in advance by the RRC signaling according to the performance of the base station and the UE, or may be transmitted to the DCI according to the necessity at the time of transmission.

Although the above description has been basically based on the NR-U transmission, the above description may be applied to all environments where channel availability is applied due to external factors. Also, although the first and second embodiments may be applied interdependently, each of the methods may be independent of each other and one or more than two may be applied separately as needed.

Through the method provided in this disclosure, broadband high-speed transmission may be performed in a channel environment in which some channels cannot be intermittently used by external factors such as the NR-U. In addition, the receiving side may acquire supplementary information that can increase the reception success rate in the same channel environment through the method provided in the present disclosure. In order to efficiently support the reception and the decoding process based on the reception information, the transport block may be reconstructed according to the channel situation.

According to these embodiments, when the resource allocation is performed over a plurality of subbands in the unlicensed band, the wireless communication may be efficiently performed when a part of subbands of the resource is in an unavailable state. In addition, by transmitting information on the LBT failure range, which is a non-available subband, the wireless communication may be efficiently performed even when some of the subbands of the resource are in an unavailable state.

Hereinafter, structures of a UE and a base station capable of performing some or all of the embodiments described in connection with FIG. 1 to FIG. 16 will be described with reference to the drawings.

Figure 17:
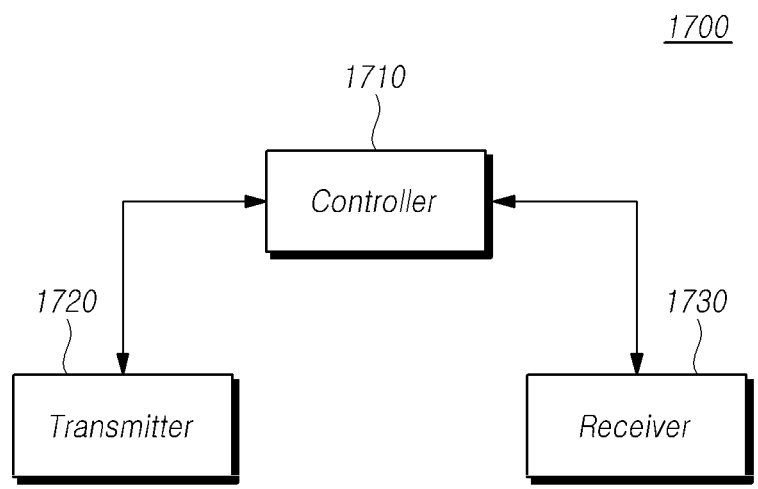
FIG. 17 is a view illustrating a user equipment according to an embodiment.

FIG. 17 is a diagram illustrating a user equipment 1700 according to an embodiment.

Referring to FIG. 17, a user equipment (UE) 1700 includes a controller 1710, a transmitter 1720 and a receiver 1730.

The controller 1710 controls the overall operations of the user equipment 1700 according to a method of the UE for performing the wireless communication in the unlicensed band. The transmitter 1720 transmits uplink control information, data, and messages to the base station through corresponding channels. The receiver 1730 receives, from a base station, downlink control information, data, and messages through corresponding channels.

For example, the receiver 1730 may receive system information on allocating a radio resource in a system bandwidth made up of a plurality of subbands. The base station may allocate the radio resource to be used for transmitting the downlink signal or channel to the user equipment 1700 for its bandwidth part. The receiver 1730 may receive allocation information for a resource block (RB) in the frequency domain and allocation information for a transmission start symbol and a duration in the time domain from the base station. As an example, the information for allocating the radio resource may be indicated through downlink control information (DCI).

The receiver 1730 may receive information on a LBT (Listen Before Talk) failure region among the radio resource. For example, the base station may transmit the information on the LBT failure region to the UE on transmission of the downlink signal or the downlink channel. That is, the information on a region where the downlink signal or the downlink signal channel cannot be transmitted due to an LBT failure among allocated regions may be explicitly indicated along with transmission of the downlink signal or the downlink channel.

At least one of the plurality of subbands that is made up of the system band may be associated with the BWP of the UE. In the downlink, the base station may perform the LBT on at least one subband associated with the BWP of the UE before starting transmission to the UE.

For example, the information about the LBT failure region may be indicated through the downlink control information (DCI). The information on the LBT failure region may include information indicating whether the LBT succeeds for at least one subband associated with the BWP of the UE, that is, each of the subbands included in the radio resource allocated to the UE among the plurality of subbands.

In this case, the success or the failure of the LBT for each subband may be transmitted in a bitmap manner or a bitmap form by assigning a field value to the downlink control information. Also, if multiple start points are supported, information on the start point to be transmitted for the subband for which the LBT failed may also be transmitted through the downlink control information (DCI).

For example, the DCI including the information on the LBT failure region may be the DCI carrying the original data transmission region and method. In this case, the corresponding DCI may include the information indicating whether the LBT succeeds for the subband together with scheduling information on downlink transmission.

Alternatively, the DCI including the information on the LBT failure region may be defined with a new DCI format to convey the information about the LBT failure region. In this case, the corresponding DCI may not include the scheduling information for the downlink transmission, and the corresponding DCI may include the information LBT success/failure for the subband. In this case, the length of the corresponding message may be fixed to the number of subbands associated with the BWP allocated to each UE, fixed to the number of associated subbands throughout the carrier band, or fixed to a specific value.

According to one example, the subbands and bits in the bitmap may be mapped on a one-to-one basis. Also, if the number of bits is greater than the number of subbands, the remaining bits may be aligned to length or to location, followed by padding to the remaining bits, or by filling in the significant bits repeatedly. Also, if the number of bits is less than the number of subbands, two or more subbands may be mapped to one bit. In this case, the number of subbands corresponding to one bit may be all configured to the same value or may be configured differently according to the number of bits and the number of subbands.

The corresponding DCI may be transmitted each time the downlink signal or the downlink channel is transmitted, or may be transmitted only when there is a failed subband for the LBT. In addition, the DCI may be scrambled with an RNTI associated with a specific UE and configured to receive only the specific UE. Alternatively, the DCI may be scrambled with an RNTI associated with a plurality of UEs and configured to receive all UEs that may access the corresponding CORESET (Control Resource Set). That is, the base station may transmit the DCI including the information on the LBT failure region through the UE-group common physical downlink control channel (PDCCH).

The receiver 1730 may receive the downlink signal in other regions, except the LBT failure region, in the radio resource based on the received information on the LBT failure region.

The controller 1710 may monitor the downlink signal in other regions except the LBT failure region, in the radio resource, and control the receiver to receive the downlink signal in the region.

The controller may monitor the downlink signal based on the allocation information on the radio resource and the information on the LBT failure region. That is, the controller 1710 may identify the remaining subband except the subband in which the LBT fails, among the plurality of subbands composed of the radio resources allocated to reception of the downlink signal and the like. The receiver 1730 may receive the downlink signal or the like from the base station through the remaining subbands.

As an example, if multiple start points are supported in the unlicensed band, the base station may again perform the LBT for the subbands in which the LBT failed during the transmission of the downlink signal. If the LBT is successful for a subband in which the LBT fails, the receiver 1730 may receive the information on whether to fail or succeed the LBT and the transmission start point for the corresponding subband through the DCI. Accordingly, after the transmission start point, the whether to fail or succeed the LBT may monitor the subband in which the LBT succeeded during the downlink transmission and receive the downlink signal.

The user equipment 1700 according to an embodiment may efficiently perform the wireless communication in an unlicensed band when resource allocation is performed over the plurality of the subbands in the unlicensed band and a part of the subbands of an allocated resource is in an unavailable state or not available. The user equipment 1700 according to an embodiment may receive the information on the LBT failure region, which is a subband in an unavailable state when the resource allocation is performed over the plurality of the subbands in the unlicensed band.

Figure 18:
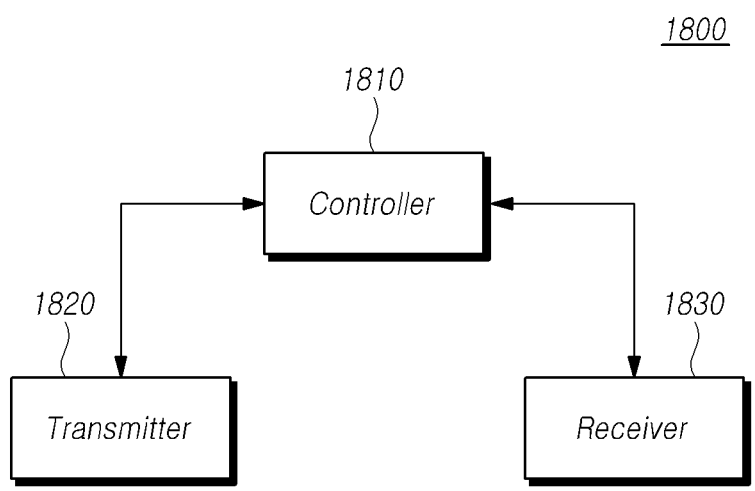
FIG. 18 is a view illustrating a base station according to an embodiment.

FIG. 18 is a diagram showing a base station 1800 according to an embodiment.

Referring to FIG. 18, a base station 1800 includes a control unit 1810, a transmitter 1820, and a receiver 1830.

The controller 1810 controls the overall operations of the base station 1800 according to a method of the base station for performing the wireless communication in the unlicensed band. The transmitter 1820 and the receiver 1830 are used to transmit and receive signals, messages, or data necessary for carrying out the above-described disclosure to and from a UE.

The controller 1810 may perform a LBT (Listen Before Talk) for each of subbands in a system bandwidth composed of a plurality of the subbands. As an example, it is assumed that the system band in the unlicensed band is composed of the plurality of subbands corresponding to the LBT performance unit of 20 MHz. For example, it may be assumed a band of 100 MHz composing of five subbands. At least one of the plurality of subbands may be configured as a bandwidth part (BWP) of the user equipment.

In order to transmit the radio signal through the unlicensed band, the controller 1810 may perform the LBT procedure or the LBT to confirm whether or not the corresponding radio channel is occupied by another node. That is, the controller 1810 may perform the LBT procedure for at least one subband configured with the BWP of the UE in order to transmit the downlink signal or the downlink channel to the UE in the unlicensed band. As a result of performing the LBT procedure, if the subband of the corresponding unlicensed band is not occupied, the controller 1810 may transmit the PDCCH and the corresponding PDSCH using the subband to the UE through the transmitter 1820.

The transmitter 1820 may transmitting information on allocating a radio resource in the system bandwidth and information on a LBT (Listen Before Talk) failure region among the radio resource and transmit a downlink signal in other regions, except the LBT failure region, in the radio resource.

The controller 1810 may allocate the radio resource to be used for transmitting the downlink signal or channel to the UE for its bandwidth part. The transmitter 1820 may transmit the allocation information for the resource block (RB) in the frequency domain and the allocation information for the transmission start symbol and the duration in the time domain to the UE. For example, the information for allocating the radio resource may be indicated through downlink control information (DCI).

For example, the transmitter 1820 may transmit the information on the LBT failure region to the UE on transmission of the downlink signal or the downlink channel. That is, the transmitter 1820 may explicitly indicate the information on a region where the downlink signal or the downlink signal channel cannot be transmitted due to an LBT failure among allocated regions, along with transmission of the downlink signal or the downlink channel.

For example, the information about the LBT failure region may be indicated through the downlink control information (DCI). The information on the LBT failure region may include the information indicating whether the LBT succeeds for at least one subband associated with the BWP of the UE, that is, each of the subbands included in the radio resource allocated to the UE among the plurality of subbands.

In this case, the success or the failure of the LBT for each subband may be transmitted in a bitmap manner or a bitmap form by assigning a field value to the downlink control information. Also, if multiple start points are supported, the information on the start point to be transmitted for the subband for which the LBT failed may also be transmitted through the downlink control information (DCI).

As one example, the DCI including the information on the LBT failure region may be the DCI carrying the original data transmission region and method. In this case, the corresponding DCI may include the information indicating whether the LBT succeeds for the subband together with scheduling information on downlink transmission.

Alternatively, the DCI including the information on the LBT failure region may be defined with a new DCI format to convey the information about the LBT failure region. In this case, the corresponding DCI may not include the scheduling information for the downlink transmission, and the corresponding DCI may include the information LBT success/failure for the subband. In this case, the length of the corresponding message may be fixed to the number of subbands associated with the BWP allocated to each UE, fixed to the number of associated subbands throughout the carrier band, or fixed to a specific value.

For example, the subbands and the bits in the bitmap may be mapped on a one-to-one basis. Also, if the number of bits is greater than the number of the subbands, the remaining bits may be aligned to length or location, followed by padding to the remaining bits, or by filling in the significant bits repeatedly. Also, if the number of the bits is less than the number of the subbands, two or more the subbands may be mapped to one bit. In this case, the number of the subbands corresponding to one bit may be all configured to the same value or may be configured differently according to the number of the bits and the number of the subbands.

The corresponding DCI may be transmitted each time when the downlink signal or the downlink channel is transmitted, or the corresponding DCI may be transmitted only when there is a failed subband for the LBT. In addition, the DCI may be scrambled with an RNTI associated with a specific UE and configured to receive only the specific UE.

Alternatively, the DCI may be scrambled with an RNTI associated with a plurality of UEs and configured to receive all UEs that may access the corresponding CORESET (Control Resource Set). Alternatively, a new RNTI may be defined for use in the DCI, which does not use the INT-RNTI and contains information about the LBT failure region for the subband. For example, the newly defined RNTI may be referred to as an occupied subband indication RNTI(OSI-RNTI) or the like.

The newly defined occupied subband indication RNTI may be preallocated to UE-groups using an unlicensed band composed of the plurality of subbands. The CRC bits of the DCI including the information on the LBT failure region for the subband may be scrambled with the occupied subband indication RNTI and transmitted through the PDCCH. Each UE in the UE-group receives the DCI through the corresponding PDCCH and may check the CRC of the DCI using the occupied subband indication RNTI. Accordingly, as described above, all UEs capable of accessing the corresponding CORESET may receive the information on the LBT failure region. In this case, the used PDCCH may be defined as a group common PDCCH (GC-PDCCH).

The transmitter 1820 may transmit the downlink signal and the like based on the allocation information on the radio resource and the information on the LBT failure region. That is, the controller 1810 may identify the remaining subband, except the subband in which the LBT fails, among the plurality of subbands composed of the radio resources allocated to reception of the downlink signal and the like. The base station may transmit the downlink signal or the like to the UE through the remaining subbands.

For example, if multiple start points are supported in the unlicensed band, the controller 1810 may again perform the LBT for the subbands in which the LBT failed during the transmission of the downlink signal. If the LBT is successful for a subband in which the LBT fails, the controller 1810 may transmit information on the LBT success and the transmission start point for the corresponding subband through the DCI to the UE. Accordingly, after the transmission start point, the UE may monitor the subband in which the LBT succeeded during the downlink transmission and receive the downlink signal.

The base station 1800 according to embodiments of the present disclosure may efficiently perform the wireless communication in an unlicensed band when resource allocation is performed over the plurality of the subbands in the unlicensed band and a part of the subbands of an allocated resource is in an unavailable state or not available. The base station 1810 according to embodiments of the present disclosure may transmit the information on the LBT failure region, which is a subband in an unavailable state when the resource allocation is performed over the plurality of the subbands in the unlicensed band.

The embodiments described above may be supported by the standard documents disclosed in at least one of the radio access systems such as IEEE 802, 3GPP, and 3GPP2. That is, the steps, configurations, and parts, which have not been described in the present embodiments, may be supported by the above-mentioned standard documents for clarifying the technical concept of the disclosure. In addition, all terms disclosed herein may be described by the standard documents set forth above.

The above-described embodiments may be implemented by any of various means. For example, the present embodiments may be implemented as hardware, firmware, software, or a combination thereof.

In the case of implementation by hardware, the method according to the present embodiments may be implemented as at least one of an application specific integrated circuit (ASIC), a digital signal processor (DSP), a digital signal processing device (DSPD), a programmable logic device (PLD), a field programmable gate array (FPGA), a processor, a controller, a microcontroller, or a microprocessor.

In the case of implementation by firmware or software, the method according to the present embodiments may be implemented in the form of an apparatus, a procedure, or a function for performing the functions or operations described above. Software code may be stored in a memory unit, and may be driven by the processor. The memory unit may be provided inside or outside the processor, and may exchange data with the processor by any of various well-known means.

In addition, the terms "system", "processor", "controller", "component", "module", "interface", "model", "unit", and the like may generally mean computer-related entity hardware, a combination of hardware and software, software, or running software. For example, the above-described components may be, but are not limited to, a process driven by a processor, a processor, a controller, a control processor, an entity, an execution thread, a program and/or a computer. For example, both the application that is running in a controller or a processor and the controller or the processor may be components. One or more components may be provided in a process and/or an execution thread, and the components may be provided in a single device (e.g., a system, a computing device, etc.), or may be distributed over two or more devices.

The above embodiments of the present disclosure have been described only for illustrative purposes, and those skilled in the art will appreciate that various modifications and changes may be made thereto without departing from the scope and spirit of the disclosure. Further, the embodiments of the disclosure are not intended to limit, but are intended to illustrate the technical idea of the disclosure, and therefore the scope of the technical idea of the disclosure is not limited by these embodiments. The scope of the present disclosure shall be construed on the basis of the accompanying claims in such a manner that all of the technical ideas included within the scope equivalent to the claims belong to the present disclosure.

What is claimed is:

1. A wireless device, comprising:
a transmitter;
a receiver; and
a controller which controls one or more of the transmitter and the receiver to:
  receive, from a base station, configuration information about a plurality of subbands in an unlicensed band; and
  receive, from the base station, downlink control information (DCI) including a bitmap,
  wherein each bit in the bitmap indicates an availability or unavailability for a reception in a corresponding subband,
  wherein based on the bitmap indicating at least one subband as available for the reception, the wireless device is able to receive a downlink signal from the base station,
  wherein based on that all subbands in the bitmap are determined as unavailable for the reception, the wireless device does not receive a channel state information reference signal (CSI-RS), and
  wherein the DCI further includes information indicating whether a listen before talk (LBT) succeeds for each of the plurality of subbands.

2. The wireless device of claim 1, wherein the DCI is scrambled with a Radio Network Temporary Identifier (RNTI) commonly applied to a plurality of wireless devices which access a same control resource set (CORESET) and received through a group common physical downlink control channel (PDCCH).

3. The wireless device of claim 1,
wherein the controller is configured to further control the receiver to: receive information on a guard band, and
wherein the guard band includes one or more resource blocks (RBs).

4. The wireless device of claim 1, wherein each subband includes a plurality of resource blocks (RBs).

5. The wireless device of claim 1, wherein before receiving the downlink signal, a listen before talk (LBT) is performed by the base station.

6. An apparatus for a wireless device, comprising:
a controller which controls one or more of a transmitter and a receiver of the wireless device to:
receive, from a base station, configuration information about a plurality of subbands in an unlicensed band; and
receive, from the base station, downlink control information (DCI) including a bitmap,
wherein each bit in the bitmap indicates an availability or unavailability for a reception in a corresponding subband,
wherein based on the bitmap indicating at least one subband as available for the reception, the wireless device is able to receive a downlink signal from the base station,
wherein based on that all subbands in the bitmap are determined as unavailable for the reception, the wireless device does not receive a channel state information reference signal (CSI-RS), and
wherein the DCI further includes information indicating whether a listen before talk (LBT) succeeds for each of the plurality of subbands.

7. The apparatus of claim 6, wherein the DCI is scrambled with a Radio Network Temporary Identifier (RNTI) commonly applied to a plurality of wireless devices which access a same control resource set (CORESET) and received through a group common physical downlink control channel (PDCCH).

8. The apparatus of claim 6, wherein each subband includes a plurality of resource blocks (RBs).

9. The apparatus of claim 6, wherein before receiving the downlink signal, a listen before talk (LBT) is performed by the base station.

10. A base station, comprising:
a transmitter;
a receiver; and
a controller which controls one or more of the transmitter and receiver to:
transmit, to a wireless device, configuration information about a plurality of subbands in an unlicensed band; and
transmit, to the wireless device, downlink control information (DCI) including a bitmap,
wherein each bit in the bitmap indicates an availability or unavailability for a reception in a corresponding subband,
wherein based on the bitmap indicating at least one subband as available for the reception, the wireless device is able to receive a downlink signal from the base station,
wherein based on that all subbands in the bitmap are determined as unavailable for the reception, the wireless device does not receive a channel state information reference signal (CSI-RS), and
wherein the DCI further includes information indicating whether a listen before talk (LBT) succeeds for each of the plurality of subbands.

11. The base station of claim 10, wherein the DCI is scrambled with a Radio Network Temporary Identifier (RNTI) commonly applied to a plurality of wireless devices which access a same control resource set (CORESET) and received through a group common physical downlink control channel (PDCCH).

12. The base station of claim 10, wherein each subband includes a plurality of resource blocks (RBs).

13. The base station of claim 10, wherein before receiving the downlink signal, the base station performs a listen before talk (LBT).

* * * * *